(12) United States Patent
Lai et al.

(10) Patent No.: US 10,409,763 B2
(45) Date of Patent: Sep. 10, 2019

(54) APPARATUS AND METHOD FOR EFFICIENTLY IMPLEMENTING A PROCESSOR PIPELINE

(71) Applicant: Intel Corporation, Santa Clara, CA (US)

(72) Inventors: Patrick P. Lai, Fremont, CA (US); Ethan Schuchman, Santa Clara, CA (US); David Keppel, Mountain View, CA (US); Denis M. Khartikov, San Jose, CA (US); Polychronis Xekalakis, San Jose, CA (US); Joshua B. Fryman, Corvallis, OR (US); Allan D. Knies, Burlingame, CA (US); Naveen Neelakantam, Mountain View, CA (US); Gregor Stellpflug, Braunschweig (DE); John H. Kelm, Sunnyvale, CA (US); Mirem Hyuseinova Seidahmedova, Barcelona (ES); Demos Pavlou, Barcelona (ES); Jaroslaw Topp, Schoeppenstedt (DE)

(73) Assignee: INTEL CORPORATION, Santa Clara, CA (US)

( * ) Notice: Subject to any disclaimer, the term of this patent is extended or adjusted under 35 U.S.C. 154(b) by 693 days.

(21) Appl. No.: 14/319,265

(22) Filed: Jun. 30, 2014

(65) Prior Publication Data
US 2015/0378731 A1    Dec. 31, 2015

(51) Int. Cl.
*G06F 15/76* (2006.01)
*G06F 9/30* (2018.01)
(Continued)

(52) U.S. Cl.
CPC .......... *G06F 15/76* (2013.01); *G06F 9/30174* (2013.01); *G06F 9/3824* (2013.01);
(Continued)

(58) Field of Classification Search
CPC .. G06F 9/45516; G06F 9/4552; G06F 9/4881; G06F 9/30174
See application file for complete search history.

(56) References Cited

U.S. PATENT DOCUMENTS

| | | | |
|---|---|---|---|
| 6,412,057 B1 * | 6/2002 | Sasahara | G06F 12/10 711/202 |
| 7,073,044 B2 * | 7/2006 | Willis | G06F 12/1027 711/147 |

(Continued)

OTHER PUBLICATIONS

Guan et al., "Multithreaded Optimizing Technique for Dynamic Binary Translator CrossBit", 2008, IEEE. (Year: 2008).*

*Primary Examiner* — Benjamin P Geib
(74) *Attorney, Agent, or Firm* — Nicholson de Vos Webster & Elliott LLP

(57) ABSTRACT

Various different embodiments of the invention are described including: (1) a method and apparatus for intelligently allocating threads within a binary translation system; (2) data cache way prediction guided by binary translation code morphing software; (3) fast interpreter hardware support on the data-side; (4) out-of-order retirement; (5) decoupled load retirement in an atomic OOO processor; (6) handling transactional and atomic memory in an out-of-order binary translation based processor; and (7) speculative memory management in a binary translation based out of order processor.

8 Claims, 40 Drawing Sheets

(51) Int. Cl.
*G06F 9/38* (2018.01)
*G06F 9/46* (2006.01)
*G06F 9/455* (2018.01)

(52) U.S. Cl.
CPC .......... *G06F 9/3832* (2013.01); *G06F 9/4552* (2013.01); *G06F 9/46* (2013.01)

(56) References Cited

U.S. PATENT DOCUMENTS

| | | | |
|---|---|---|---|
| 7,805,577 B1* | 9/2010 | Mattina | G06F 12/0817 711/119 |
| 8,739,165 B2* | 5/2014 | Russell | G06F 9/5027 718/102 |
| 2004/0015888 A1* | 1/2004 | Fujii | G06F 9/45504 717/136 |

* cited by examiner sample gISA code — 1401

```
A: ld %rA=[%sp+8]
B: ld %rB=[%rC+4]
C: xor %rC=%rC,1
D: bnz 0x1234
E: st [%sp+8]=%rC
```

(a)

sample hISA translation — 1402

```
w: { commit }
x: { ld.0 %rA=[%sp+8] ; ld %rB=[%rC+4] ; xor %rC=%rC,1 }
y: { st.0 [%sp+8]=%rC ; bnz T,0x1234 }
z: ...
```

```
bop_rri:
    { execa OP,S2,RD,RS0,RS1 ; OP.S2.cc RD=RS0,RS1 ; cmit.a ; brhp } bop_rrsi:
    { execa RS0,IMM ; shl %r17=RS0,IMM
      execa OP,RD,RS1 ; OP.S2.cc RD,%r17,RS1 ; cmit.a ; brhp }
```

```
brcc_eq:
taken = read_flags().eq
write_taken(taken)
update_branch_history(read_g_pc(), taken)
( cmit.a ; brhp )
br_target_profile:
do_translate = update_instruction_profiles(read_g_pc())
if do_translate:
    ( cmit ; return )
( cmit.a ; brhp )
```

| | retirement order buffer (ROB) 2802 |
|---|---|
| A | free pending load resources |
| B | free old %rA=PR29 |
| C | free old %rC=PR57 |
| D | mark successors non-speculative |
| E | ... |
| ... | |

| | sample code 2801 |
|---|---|
| A: | ld %rA=[%rB+8] |
| B: | add %rA=%rA,1 |
| C: | xor %rC=%rC,1 |
| D: | bnz 0x1234 |
| E: | add %rD=%rD+2 |

FIG. 28 sample gISA code 3001

```
A:  ld  %rA=[%rB+8]
B:  add %rA=%rA,1
C:  xor %rC=%rC,1
D:  bnz 0x1234
E:  add %rD=%rD+2
```

Sample hISA translation with in-order retirement 3002

```
w: { commit.or=1 }
x: { ld %rA=[%rB+8] ; xor.cc %rC=%rC,1 }
y: { add %rA=%rA,1 ; add %rD=%rD+2     ; bnz T.0x1234 }
z: ...
```

Sample hISA translation with out-of-order retirement 3003

```
w: { commit.or=0 }
x: { ld %rA=[%rB+8] ; xor.cc %rC=%rC,1 }
y: { add %rA=%rA,1 ; add %rD=%rD+2     ; bnz T.0x1234 }
z: ...
```

FIG. 30

APPARATUS AND METHOD FOR EFFICIENTLY IMPLEMENTING A PROCESSOR PIPELINE

BACKGROUND

Field of the Invention

This invention relates generally to the field of computer processors. More particularly, the invention relates to apparatuses and methods for (1) intelligently allocating threads within a binary translation system; (2) data cache way prediction guided by binary translation code morphing software; (3) fast interpreter hardware support on the data-side; (4) out-of-order retirement; (5) decoupled load retirement in an atomic OOO processor; (6) handling transactional and atomic memory in an out-of-order binary translation based processor; and (7) speculative memory management in a binary translation based out of order processor.

Description of the Related Art

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the microarchitecture, which is the internal design of the processor implementing the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Binary translation (BT) systems (sometimes referred to as dynamic binary translation (DBT) systems) run on a host instruction set (hISA) and simulate some guest ISA (gISA) in order that workloads in the guest ISA can run on the host machine. Translation systems read guest instructions, generate a sequence of host instructions which have the same effect, then run the host instruction sequence. Generating translations is expensive, but they are typically cached so average overhead is small. However, always translating all instructions can lead to "translation storms" and long pauses in gISA progress. In addition, it is not always feasible to cache translations, and it is common to optimize translations for normal/common behavior and to abort on uncommon/unexpected behavior.

For these reasons, BT systems commonly use an interpreter to execute code not seen previously, self-modifying code (SMC), some corner-case scenarios, and to perform additional actions, such as collecting execution profiles to guiding translation generation.

BRIEF DESCRIPTION OF THE DRAWINGS

A better understanding of the present invention can be obtained from the following detailed description in conjunction with the following drawings, in which:

FIG. 14A illustrates sample guest instruction set code (gISA) and a sample host instruction set (hISA) translation;

FIG. 25 illustrates exemplary handlers employed in one embodiment of the invention;

FIG. 26 illustrates exemplary handlers as used in certain embodiments of the invention;

FIG. 28 illustrates a sample code fragment and the corresponding entries in a retirement order buffer and resources that will be freed when the instruction retires;

FIG. 30 illustrates sample gISA code and sample translations using in-order retirement and out-of-order retirement;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
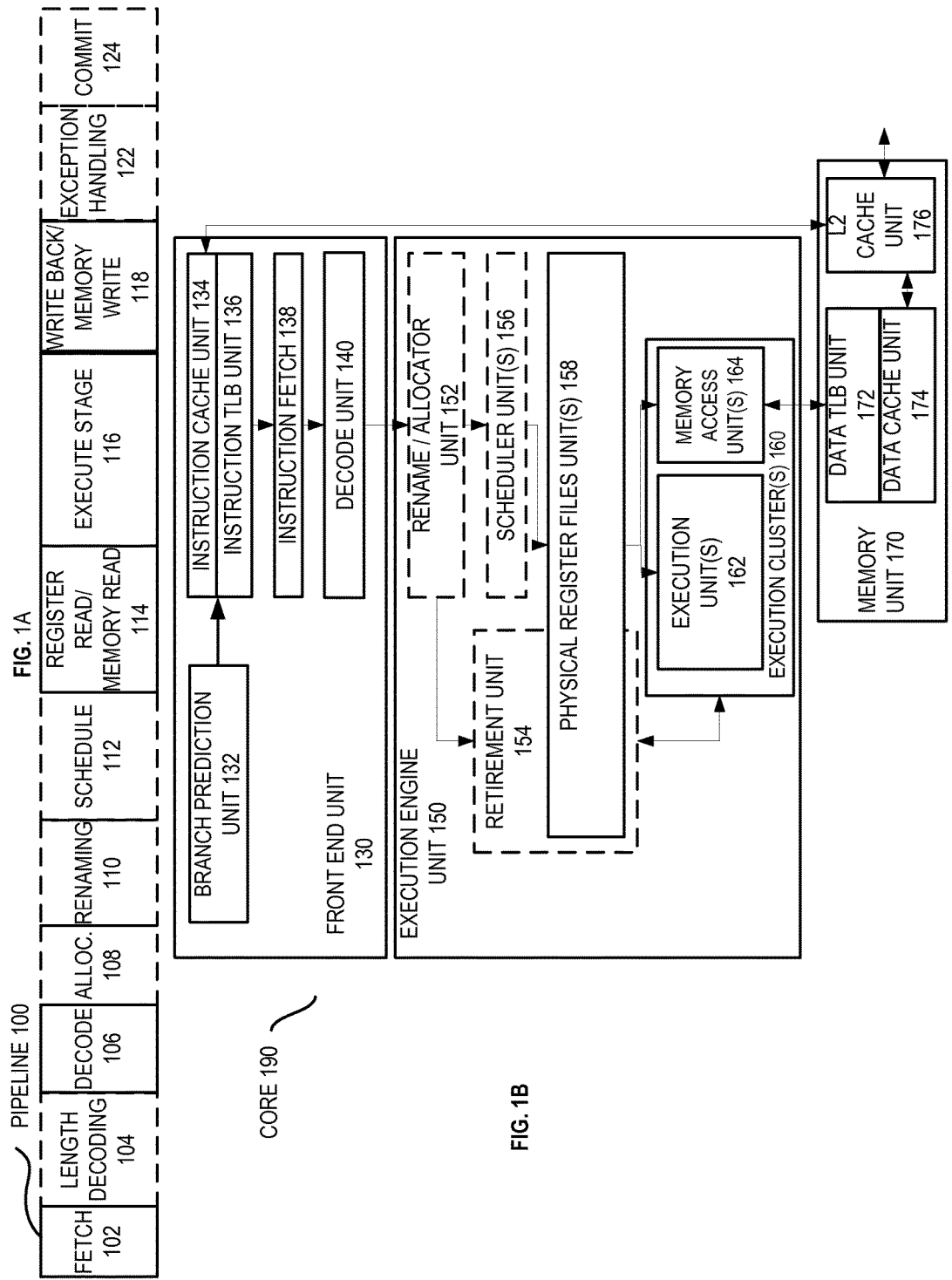
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
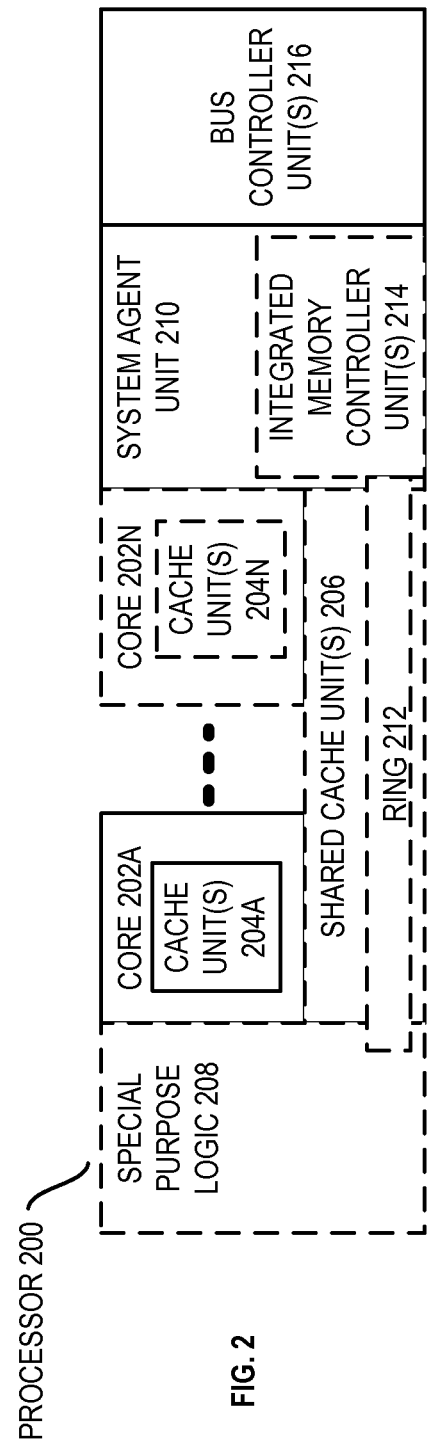
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
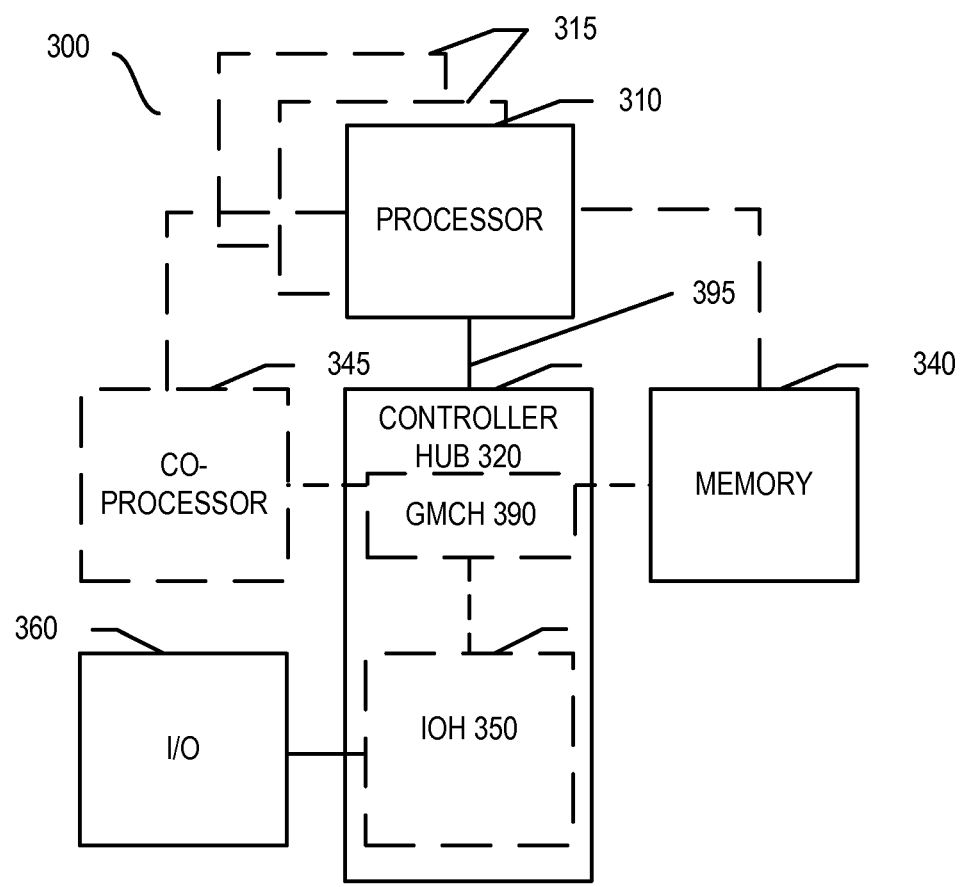
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
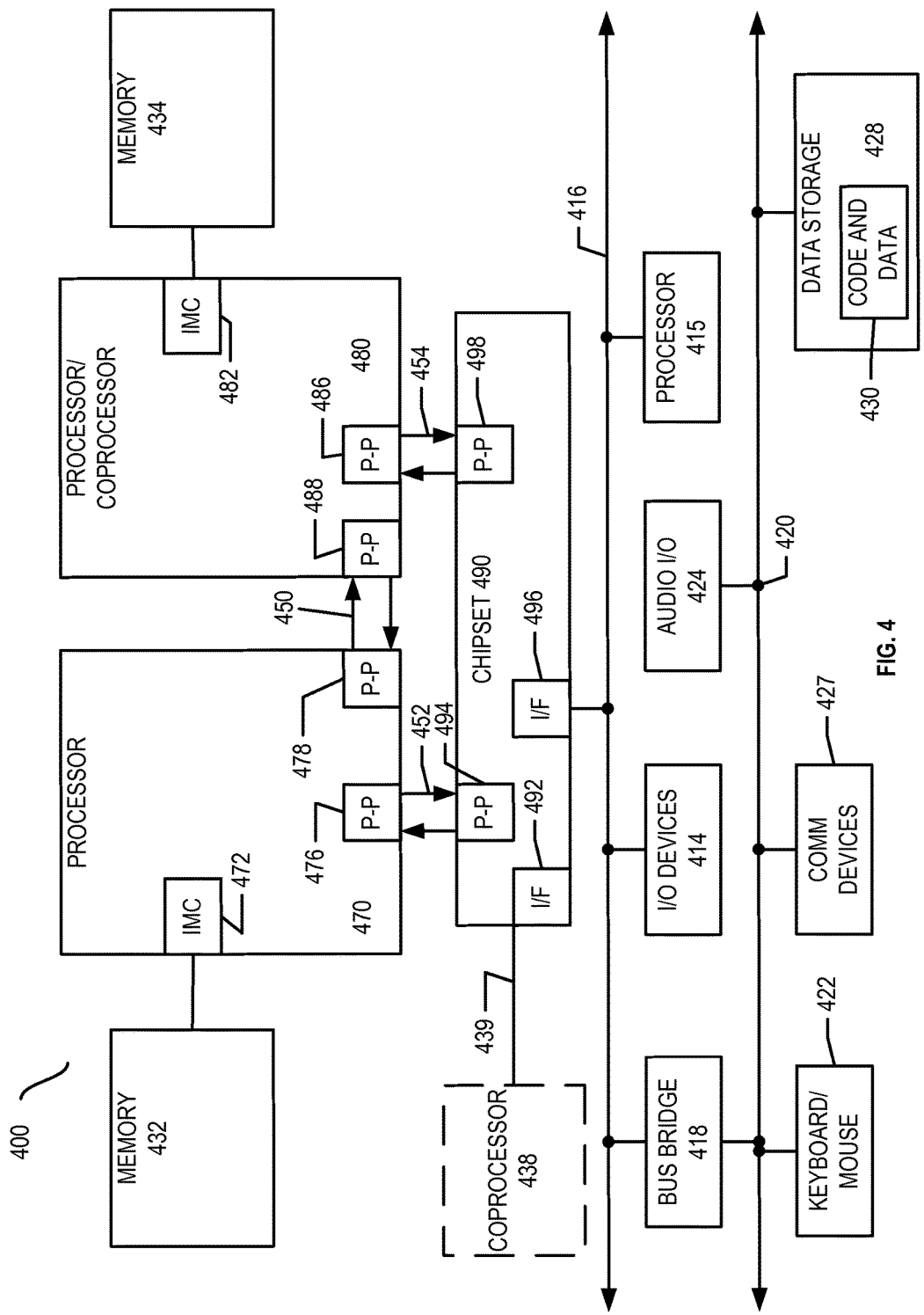
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
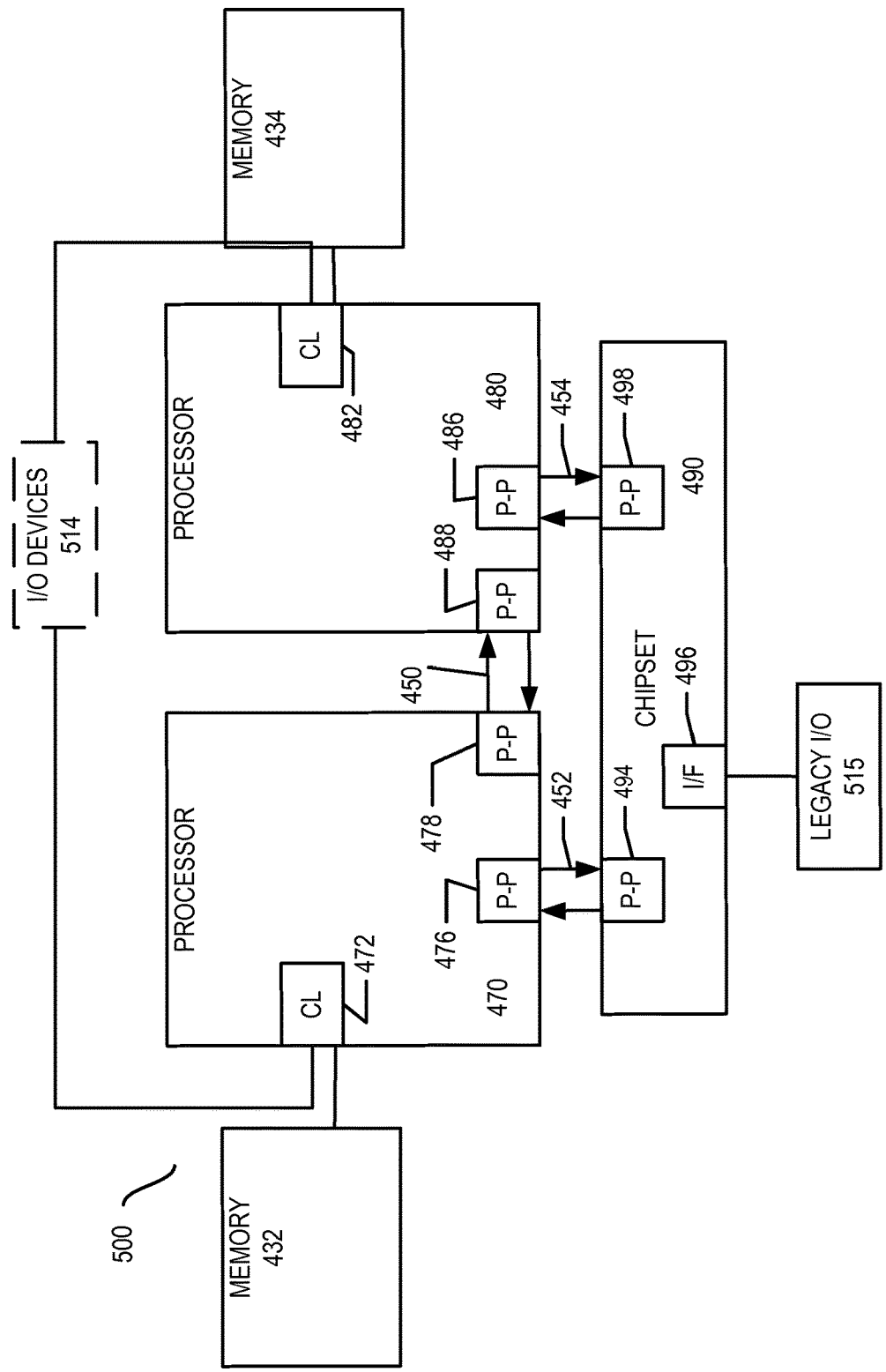
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
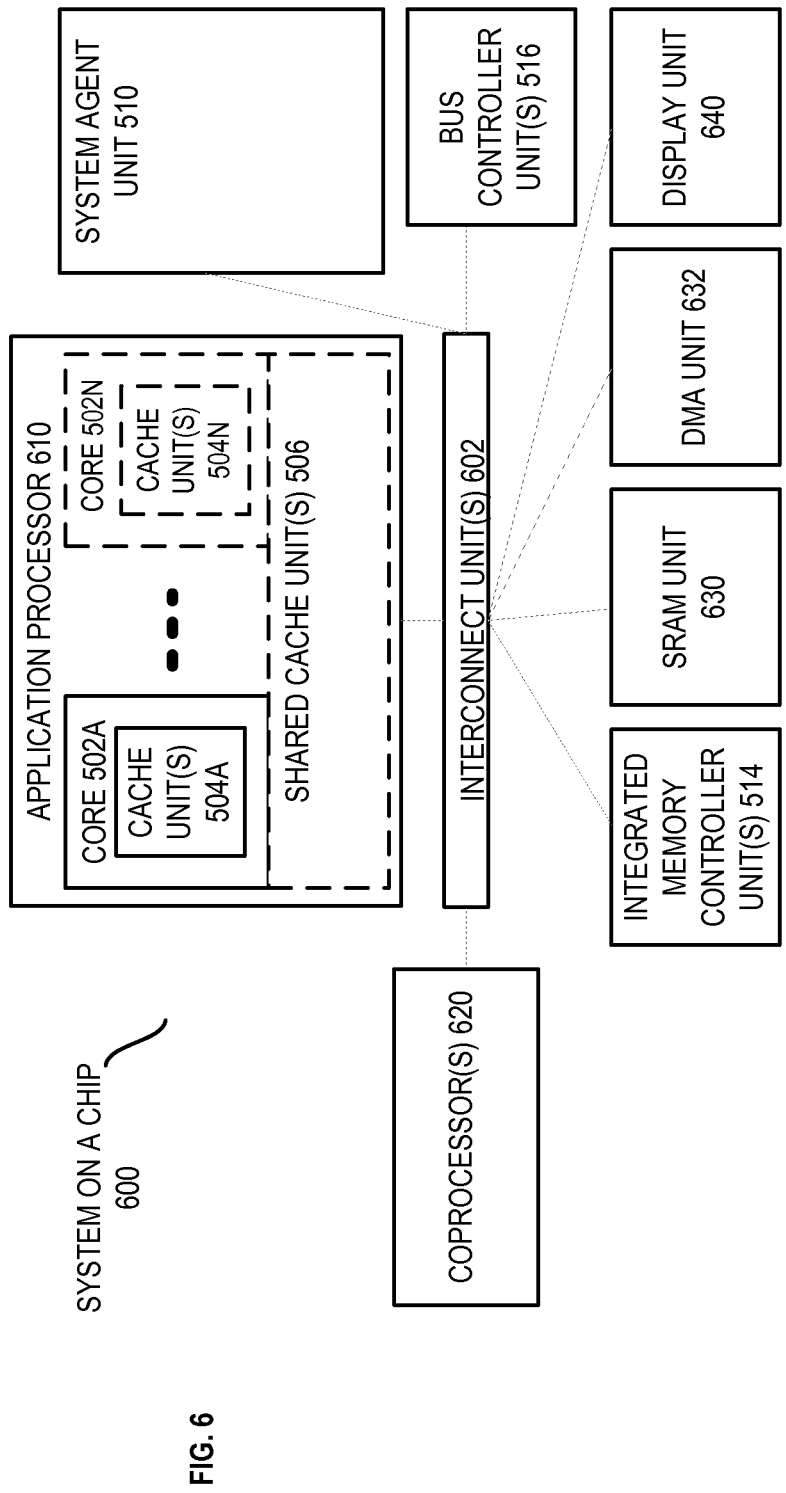
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
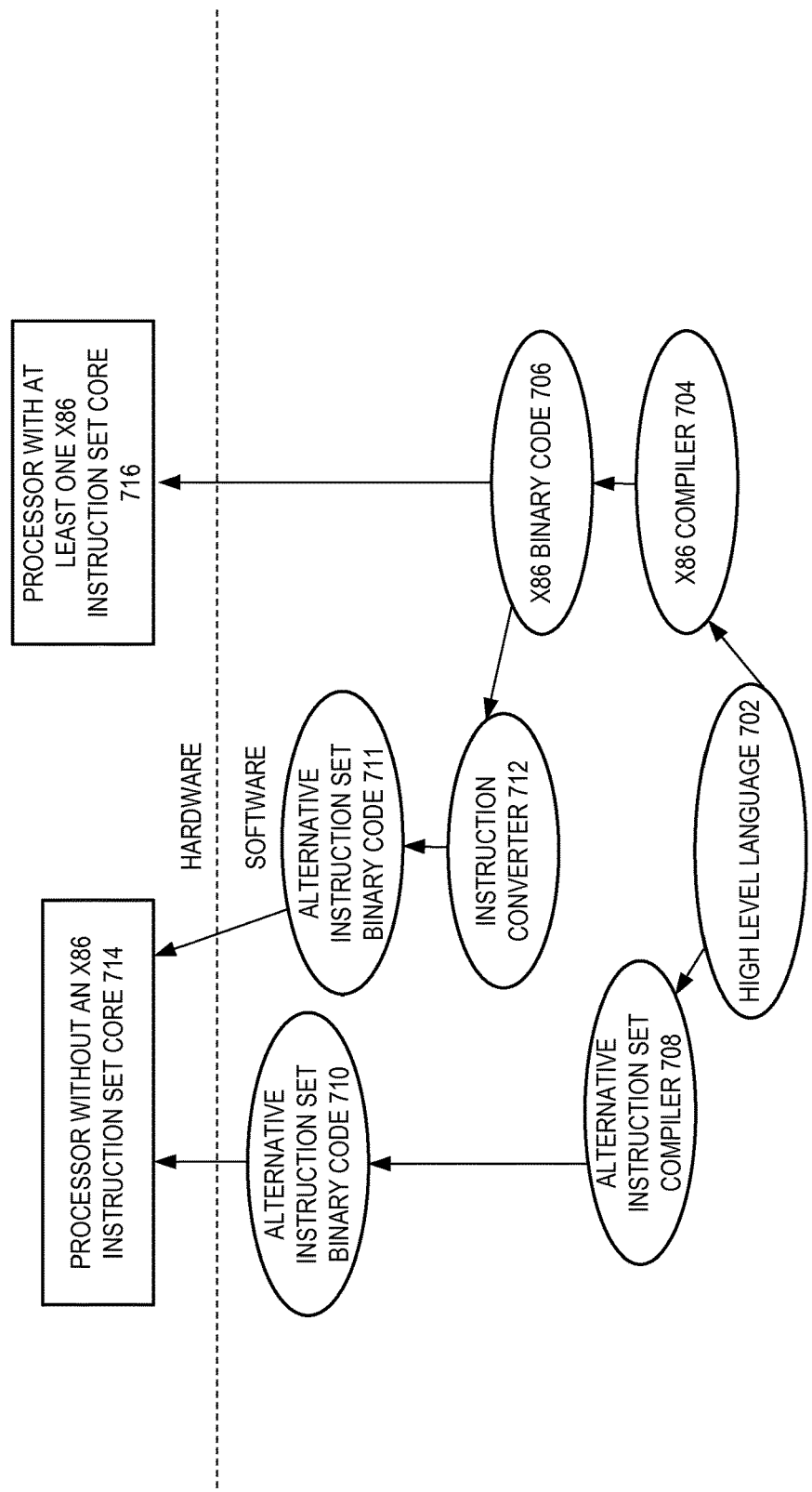
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.).

The instruction converter 712 is used to convert the x86 binary code 706 into alternative instruction set binary code 711 that may be natively executed by the processor without an x86 instruction set core 714. This converted code may or may not be the same as the alternative instruction set binary code 710 resulting from an alternative instruction set compiler 708; however, the converted code will accomplish the same general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Efficiently Implementing a Processor Pipeline

A. Colocated Threads for Binary Translation on a Simultaneous Multi-Threaded Processor In a multiprocessor system utilizing dynamic binary translation, the translator, interpreter and translation-execution threads do not necessary co-locate in an adjacent core slice. Consequently, there may be substantial cache coherence traffic among the related threads.

One embodiment of the invention allocates and executes the translator, interpreter, and translation-execution threads on the same simultaneous multi-threaded core, to enhance cache locality and reduce access latency. This may be accomplished by setting the processor affinity field of such threads so that the scheduling logic within the operating system is obliged to schedule and run them on the designated core slice or the binary translation software may be directly responsible for scheduling control. The idea can be extended to running such related threads on adjacent single-threaded cores that share the same Mid Level Cache (MLC) slices as well.

By co-locating these threads to run on a single simultaneous multi-threaded (SMT) core slice one embodiment of the invention achieves the following benefits:

(1) reducing the cache-coherence traffic on the last-level cache (LLC);

(2) increasing the efficiency of the mid-level-cache (MLC) as the source instructions, translator/interpreter binary, and generated (target) instructions are cached by the same MLC;

(3) reducing the latency/improving the performance of the system as most of the cache accesses would be confined within the core slice; and (4) reducing the expensive context switches among the different cores, when compared to a runtime system that does not enforce colocation.

Figure 8:
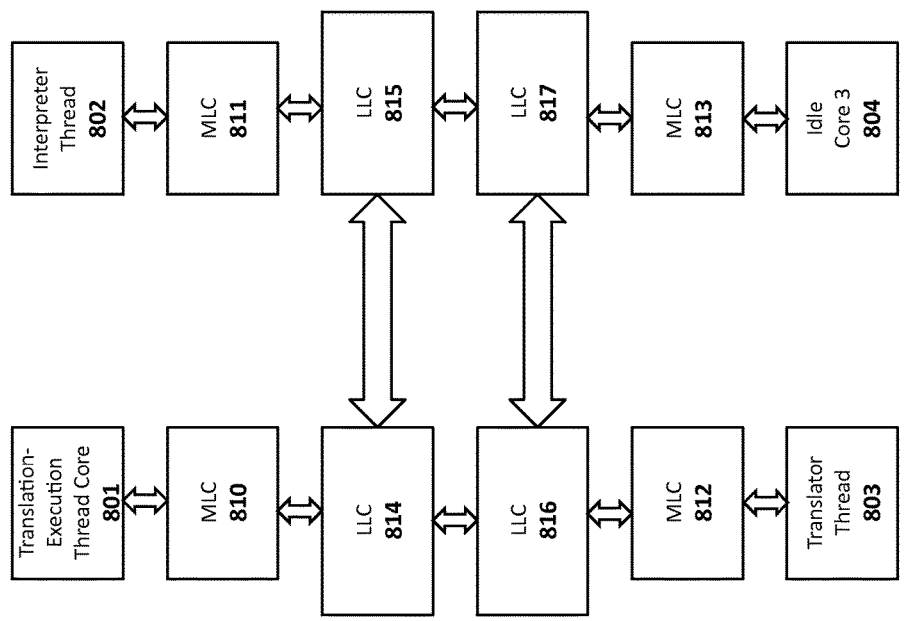
FIG. 8 illustrates an existing architecture comprising four cores, each coupled to a mid-level cache (MLC), and a set of last-level caches (LLCs)

FIG. 8 illustrates an existing architecture comprising four cores 801-804, each coupled to a mid-level cache (MLC) 810-813, and a set of last-level caches (LLCs) 814-817. In this example, the translation-execution thread is executed on core 801, the interpreter thread is executed on core 802, and the translator thread is executed on core 803. One problem with assigning the translation, translation-execution, and interpreter threads scattered around a multiprocessing system is that most of the source code page, translator binary and translated code page may be cached on different LLC/MLC slices and may therefore generate significant cache coherence traffic. In addition, the translation lookaside buffer (TLB)/joint translation lookaside buffer (JTLB) and Translation T-bit-Agent (XTBA)/trace cache (TC) entries on multiple cores would index to the same entry, reducing the total number of memory/code pages the multiprocessor system can index to as a whole.

By way of example, FIG. 8 illustrates a 4-core, all-inclusive cache system in which the translation execution, translator and interpreter threads are all dispersed among three different core slices 801-803. In such a case, the code pages for the translator and interpreter binary, the code stream in source ISA to be translated and interpreted, and the interpreted/translated code in the target ISA, would be scattered around multiple mid-level caches (MLCs) 810-812 attached the different core slices 801-803, respectively. Due to the inclusive nature of the MLCs, there could be multiple copies of the same i-stream/d-stream cache lines distributed among the MLCs. Any attempt to modify such cache lines could involve multiple cache coherence transactions to take ownership and invalidate other copies, generating coherence traffic among the MLC/LLC slices. The TLB and XTBA among the different cores might as well contain the same virtual-to-physical address translation and t-bit information that point to the same source pages and the target pages.

Figure 9:
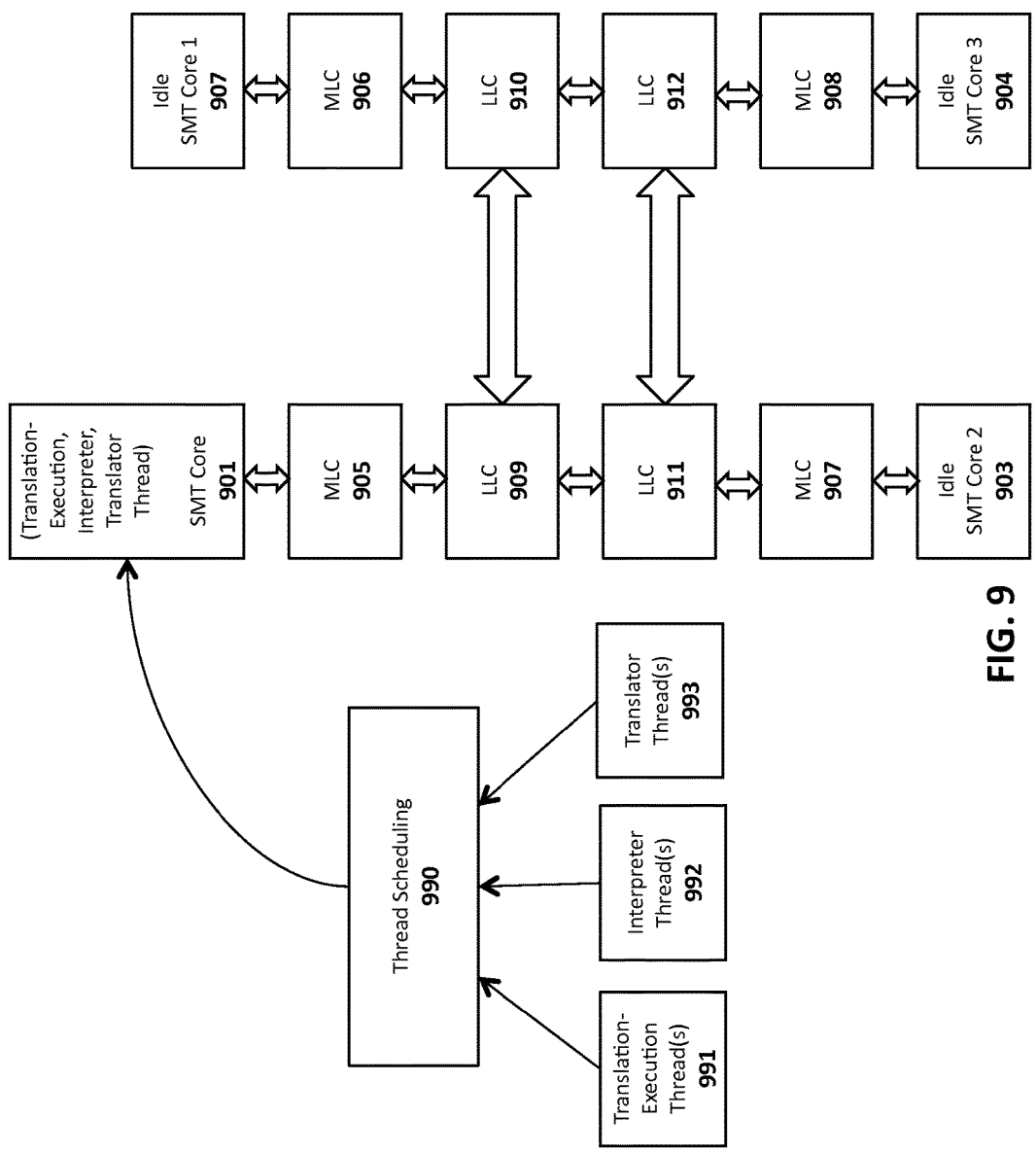
FIG. 9 illustrates thread scheduling logic to schedule the translation execution threads, interpreter threads, and translator threads on a single simultaneous multithreading (SMT) core.

As illustrated in FIG. 9, to address these inefficiencies, one embodiment of the invention includes thread scheduling logic 990 (e.g., running within the OS) to schedule the translation execution threads 991, interpreter threads 992, and translator threads 993 on a single simultaneous multi-threading (SMT) core 901. Scheduling on a single SMT core in this manner enhances both cache locality and TLB/JTLB/XTBA/TC locality, as the same source code stream associated with successive interpreter/translator/translation-execution phases would very likely index to the same set of physical memory pages, minimizing the number of TLB/JTLB/XTBA/TC misses. At each of these cores, the threads may be preempted/context-switched as a nominal part of operating system thread scheduling activity. In addition, running a binary translation system on top of SMT cores as illustrated may result in either simpler or more efficient SMT architecture, as it provides an opportunity for more optimization and efficient allocation.

Figure 10:
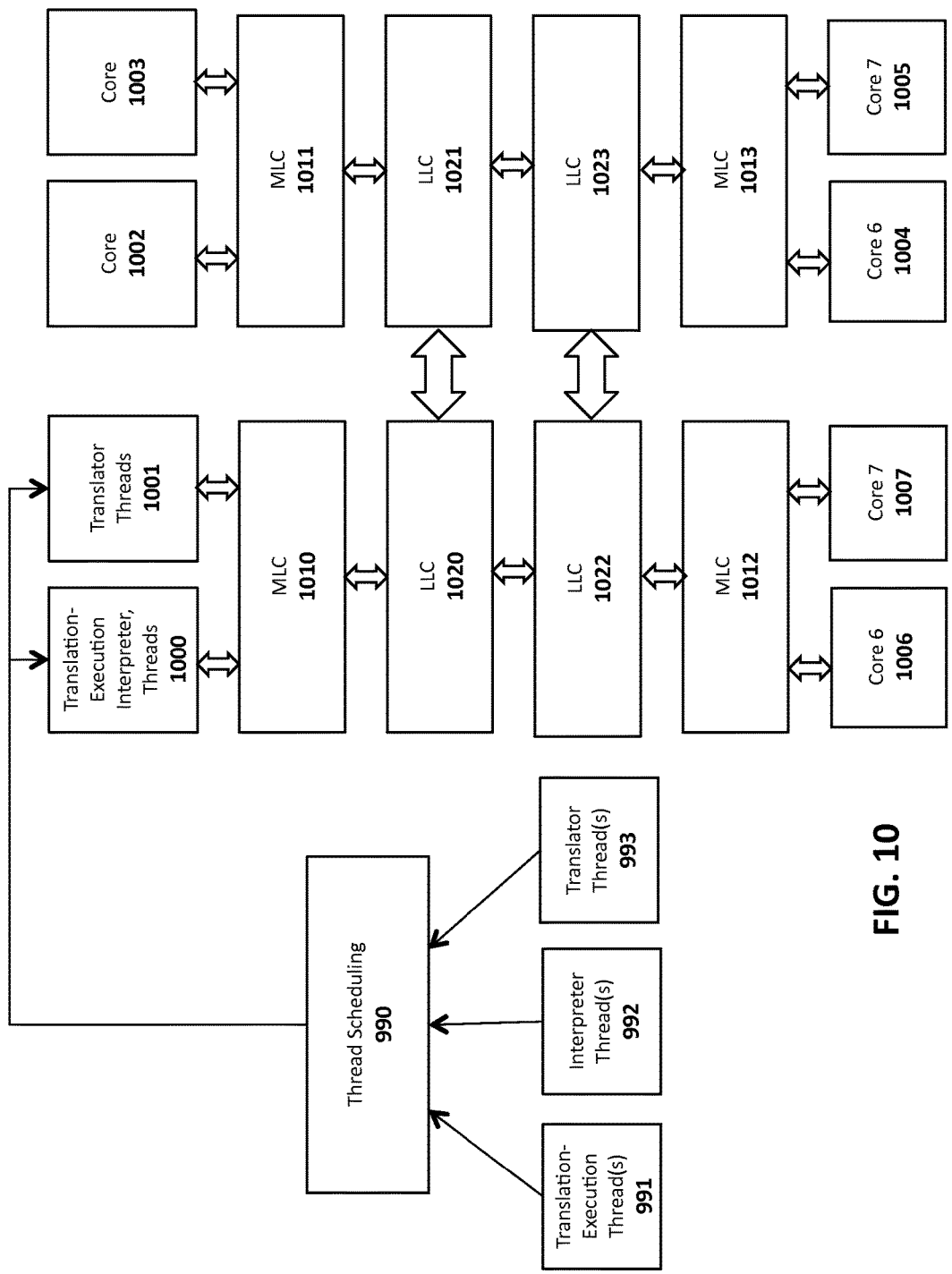
FIG. 10 illustrates one embodiment in which the thread scheduling logic schedules the translation-execution threads, interpreter threads, and translator threads to execute on two different cores which share the same MLC.

FIG. 10 illustrates one embodiment in which the thread scheduling logic 990 schedules the translation-execution threads 991, interpreter threads 992, and translator threads 993 to execute on two different cores 1000-1001 which share the same MLC 1010. The exemplary architecture shown in FIG. 10 also includes six other cores 1002-1007, MLCs 1011-1013 and LLCs 1020-1023.

The underlying principles of the invention are applicable to a system where multiple cores share the same MLC as long as the thread scheduling logic 990 schedules the interpreter/translator threads on adjacent cores sharing the same MLC as illustrated. Compared to the SMT core case shown in FIG. 9, the same TLB/XTBA entries are not shared among multiple threads as when running on the same SMT core. However, the temporal and special locality of the source ISA code fetch and translation result written to the shared MLC is still beneficial. An additional embodiment may add a tertiary TLB/XTBA which is shared between the adjacent cores, reducing the penalty in additional latency spent on fetching the TLB translation or t-bit information from either the LLC or physical memory.

Using an embodiment with a simultaneous multi-threaded core (as in FIG. 9) or an embodiment where two core slices share the same MLC (as in FIG. 10), all the relevant i-stream and d-stream cache lines would be collocated within a single MLC. Because a binary translation system goes through the various stages of interpreter mode, translation mode and translation-execution mode, the relevant cache lines would reside within the same MLC, conserving a considerable amount of the coherence fabric bandwidth. In contrast to the scenario shown in FIG. 8 where all cores slices are running their own translation-execution/translator/interpreter threads, self-contained, the reduction in traffic may be substantial. For example, in FIGS. 9 and 10, each of the MLC slices would only need to cache the cache lines relevant to what is residing their corresponding core slices, reducing the competition for resources.

The above architectures also achieve performance gains for the individual traces of execution. Given that code morphing software (CMS) may switch between interpreter mode and translation mode once encountering self-modifying code and/or exceptions, co-locating the interpreter and translator threads on the same core slice or on different cores sharing the same MLC would ensure both threads access the same source ISA cache lines that reside on the same MLC. This will also improve prefetching given that all of the consumers for the same segment of the source ISA resides in the same core slice, instead of having multiple pre-fetchers across the different cores prefetching the same source fragment introducing duplicate access that could otherwise be saved.

Figure 11:
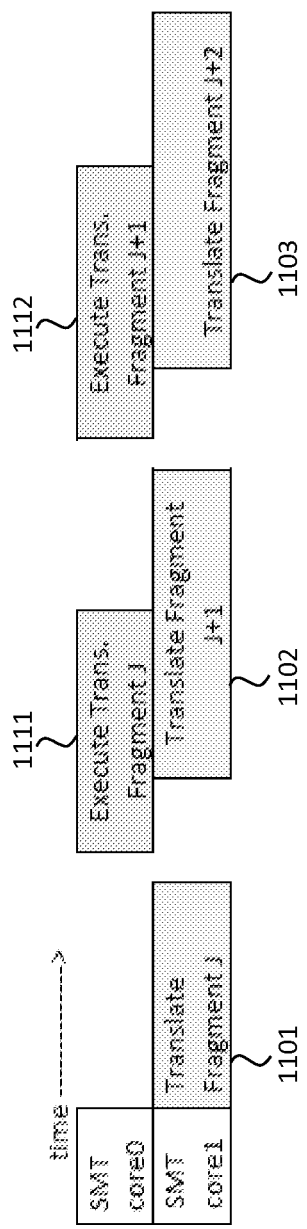
FIG. 11 illustrates exemplary timing for the translation and execution of fragments.

These embodiments provide an additional benefit in hiding the latency of the translation by exploiting both temporal and spatial locality achieved by colocation. Considering each translation of ~200 source ISA instructions can take up to a million cycles. By co-locating the translation execution thread the translator thread, the execution of the translated code fragment and the translation of the "next" code fragment could be executed concurrently on the SMT core. That is, one thread executes while the other thread translates the next fragment of instructions. FIG. 11 illustrates exemplary timing for the translation of fragment J 1101, the translation of fragment J+1 1102, and the translation of fragment of J+2 1103 on SMT core 1 and the execution of translated fragment J 1111 and translated fragment J+1 on SMT core 0. The pre-fetcher may have already pre-fetched the next set of source ISA cache lines, so by the time the translation for code fragment J finishes, the source for code fragment J+1 might already reside in the local data-cache/MLC. Consequently, the translation for the J+1 fragment can commence with the translator thread, while the translated fragment J is being executed. In the above example, "core 0" and "core 1" may actually be different logical cores on a single physical SMT core.

If the MLC is on a write-allocate, write through policy, all the translations may first be written into the MLC and then also to the relevant LLC lines. In the case of the same translation being shared by multiple processes, reuse can be achieved by accessing the translation cache already residing on the LLC. In the case of a write-allocate, write-back MLC, additional transactions would be required to access the translated code.

Easing the Design of the Simultaneous Multi-Threaded (SMT) Core

On a regular SMT machine there is always the issue of resource allocation (e.g., register allocation, reorder buffer entries, read port and write port arbitration, etc) and memory disambiguation (e.g., to detect aliasing of addressed being read from or written to by concurrently executed threads). On a SMT machine architected specifically for a system utilizing binary translation like the Code Morphing System (CMS), where the interpreter and translator run directly on physical addresses, there is no need for the virtual-to-physical address translation for such threads, hence the complexity of alias detection is reduced.

The allocation and partition of registers and various resources can also be coordinated between the interpreter and the translator, and through binary translation, the allocation of logical register space to the translated binary can also be controlled. The logical register space can be partitioned between the running threads by the runtime software, allowing for a less complex (or more efficient) SMT architecture. The allocation of the register space can could also be allocated on the fly, where threads that are more computebound can be allocated a bigger chunk of the logical register space and where threads that are more memory-bound can be allocated a smaller chunk of the logical register space, improving the overall efficiency of the system.

B. Data Cache Way Prediction Guided by Binary Translation Code Morphing Software Data caches are a key to high performance in modern processors, but are on the critical path and consume significant energy. Mainstream caches are set-associative, so each lookup requires matching several tags before the data can be selected. Way prediction provides an opportunity to shorten the lookup time because data can be fetched even before tags are compared and provides an opportunity to reduce energy because only predicted tags and fetch predicted data need to be compared (in a typical scenario). Hardware way predictors, however, have not been successfully implemented.

Figure 12:
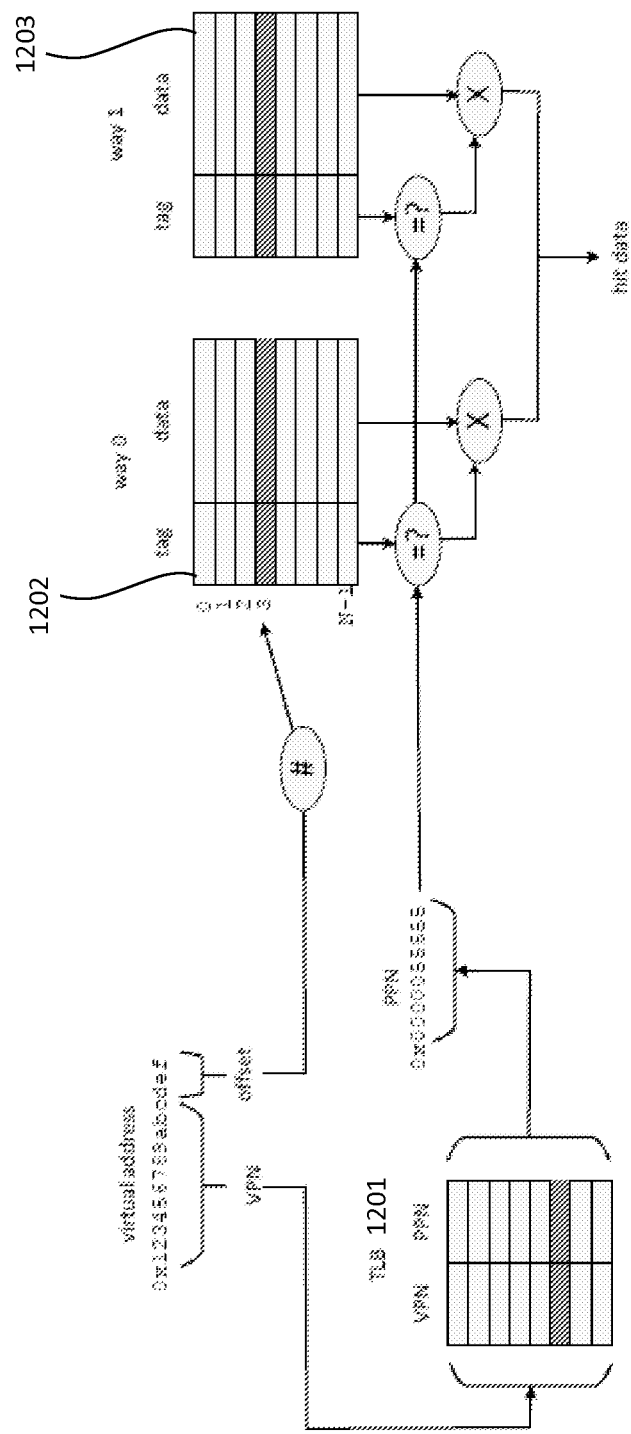
FIG. 12 illustrates a data cache having a first way and a second way with a plurality of entries comprising tags and associated data.

FIG. 12 illustrates a typical data cache having a first way 1202 and a second way 1203 with a plurality of entries comprising tags and associated data. A data cache is typically set-associative. A TLB 1201 maintains a mapping between virtual page numbers and physical page numbers. As illustrated, an offset from the virtual address is used to identify an entry in each way 1202-1203 and the resulting tag is compared with the physical page number read from the TLB 1201. If a match exists, then the data is read from the data cache. A data cache lookup thus requires indexing the structure; reading and comparing various way tags; and then using the matching tags to read and return data from the matching line.

In principle, a way predictor can reduce cache energy. Because only the indicated way needs to be accessed (in the typical case), energy is saved for the comparator. Modern caches are often 4-way or 8-way associative and so energy for tag lookup and comparison can be reduced to ¼ or ⅛. Similarly, high performance caches read all way data speculatively to improve performance; again, this means that all ways must be read although only one is used.

A way predictor can also improve performance. Rather than waiting for the TLB result (e.g., the physical page number), the data may be passed through from the predicted way without waiting for the TLB. The TLB lookup and tag comparison are done in parallel and the downstream data consumer is cancelled on a mis-predict.

The embodiments of the invention implement a way predictor using locality information from a binary translation (BT) system (e.g., using information available to or already collected by a BT system). One embodiment performs selective way prediction for high-value loads and stores rather than loads and stores generally.

Figure 13:
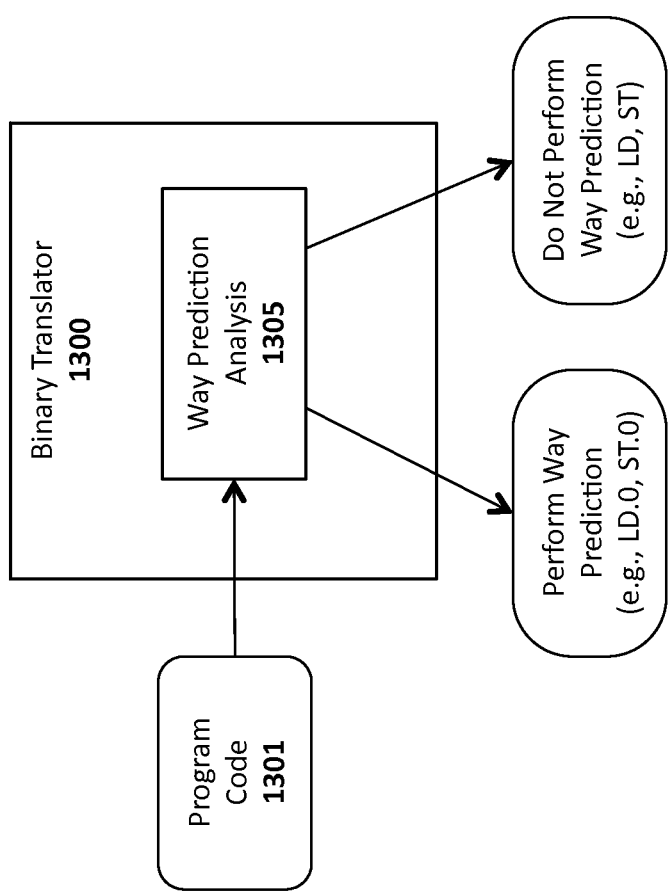
FIG. 13 illustrates one embodiment of the invention in which way prediction analysis logic analyzes program code to determine whether or not to perform way prediction.

FIG. 13 illustrates one embodiment of the invention in which a binary translator 1300 includes way prediction analysis logic 1305 to analyze program code 1301 using the techniques described herein to determine whether or not to perform way prediction. More specifically, in one embodiment, the way prediction analysis 1305 recognizes selected patterns where way prediction is likely to succeed, and indicates explicitly on an instruction-by-instruction basis where it should be applied. Thus, while the embodiments of the invention do not enable general way prediction, they do enable certain high-value cases.

In one embodiment, ordinary loads and stores behave as in prior systems. However, new load and store instructions are introduced to indicate a predicted way. LD.0 indicates that a load is to be performed and predicts it is located in way zero. ST.0 indicates that a store is to be performed and predicts it is in way zero. On a LD.0 or ST.0, the hardware initially looks only in way 0. Data is returned speculatively, assuming a tag match, and thus can be returned earlier than in the general case. The TLB lookup and tag match may be performed in parallel.

On a tag match, the load is completed, or a store is allowed to write back data. On a tag mismatch, the speculatively-returned data is squashed/discarded and the lookup is restarted to check the other ways. On a tag hit, there has been a way misprediction. Depending on the value of a configuration register, one of two actions may be taken: (a) the line is evicted from the cache (to convert to a cache miss case); or (b) a performance counter disrupts the execution instruction to inform BT software of the mis-speculation.

On miss or on a hit converted to a miss, the line is fetched in to the cache. Because it is a LD.0 or a ST.0, the LRU information is ignored and the line is placed in way zero. Since way zero may already have valid data, this case may need to also write back dirty prior data from way zero.

FIG. 14A shows (a) sample guest instruction set code (gISA) 1401; and (b) a sample host instruction set (hISA) translation 1402. The discussion below assumes the two encodings are substantially similar (e.g., differ only in opcode bit values) so the binary translator 1300 can easily convert between LD and LD.0 (e.g., by XORing the instruction with a bitmask of the difference in opcode bits).

It may be advantageous to keep 1 bit per line for way zero to indicate for performance monitoring whether a given LD.0/ST.0 is replacing another value which was also loaded using LD.0/ST.0.

The benefits of successful way prediction include both energy and performance; and to some extent higher performance reduces energy spent in stall cycles. Benefit varies with the implementation. Based on an examination of a prototype high-speed microprocessor, the load loop time may be reduced by one to two cycles.

The binary translator 1300 has various ways to use way prediction. A goal is that some frequently used data can be predicted as way zero and, at the same time, no other frequently-used data will be predicted as going to the same location in way zero. This broadly gives up to about 4 KiB of data which might be predicted, in a 32 KiB 8-way cache typically used in processors today.

In general, way prediction for arbitrary loads and stores is a difficult task. However, selected cases are much more predictable using an analysis which involves examination of a sequence of instructions and noting memory references with high locality. In one embodiment, a case which is not-predicted runs as in the prior art and a case which is predicted correctly can be faster and more efficient. A case which is mis-predicted as having locality—when, in fact it does not—wastes performance and energy. The embodiments of the invention are designed so it is easy to monitor, identify, and disable way prediction for mis-predicted cases. Thus, the performance and efficiency of mis-predicted cases can asymptotically approach the prior art—that is, with potentially very little down-side.

In one embodiment, one approach to way prediction is loads and stores of values at a specified (e.g., small) offset from the stack pointer. Many programs make heavy use of stack values within a small range of addresses. For example, an exemplary program pattern may be to call procedure P( ) and then Q( ) and then R( ) from within a loop; and each procedure will do some work and then return. Further, it is common that code needs more registers than it has, so uses stack memory as a "scratch" area or to spill and restore other active registers. This means stack values are often on the critical path. Finally, because P( ), Q( ), and R( ) are all called from the same loop, the stack memory used by P( ), Q( ), and R( ) is the same. This makes these stack accesses a good candidate for way prediction, even though the values stored in them may be unrelated—that is, frequent access to the underlying memory, rather than program data dependencies, is what makes the way predictable.

Figure 14B:
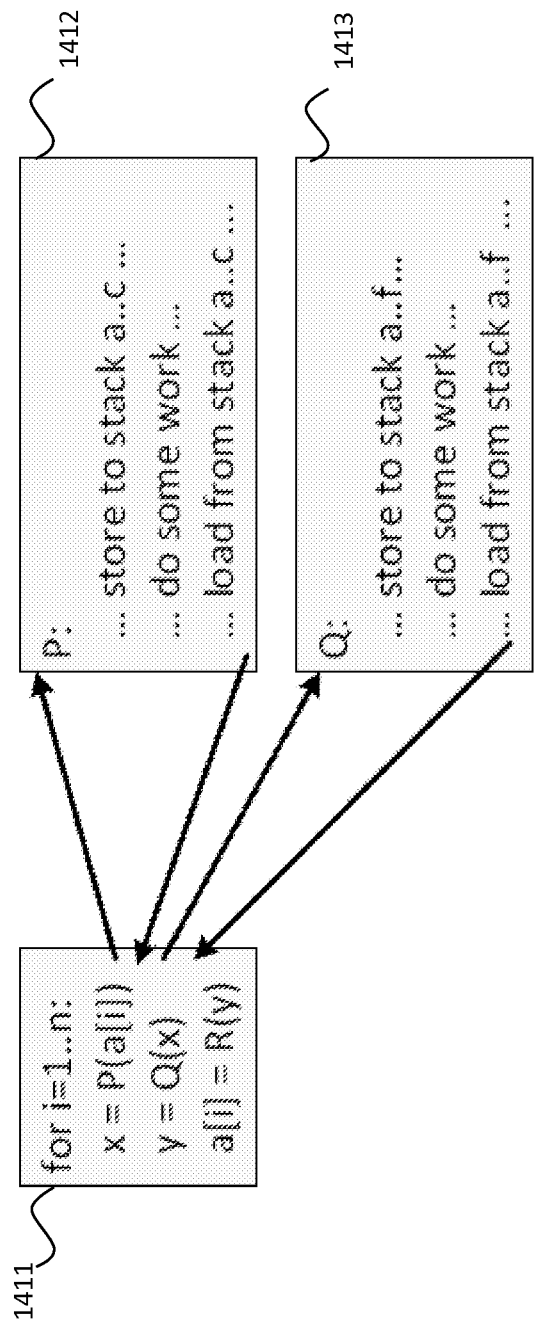
FIG. 14B illustrates exemplary stores and loads to and from a stack in response to a FOR loop.

FIG. 14B shows such a case schematically. In particular, the FOR loop 1411 results in a store to the stack followed by a load from the stack at 1412 for procedure P and also results in a store to the stack followed by a load from the stack at 1413 for procedure Q.

Figure 15A:
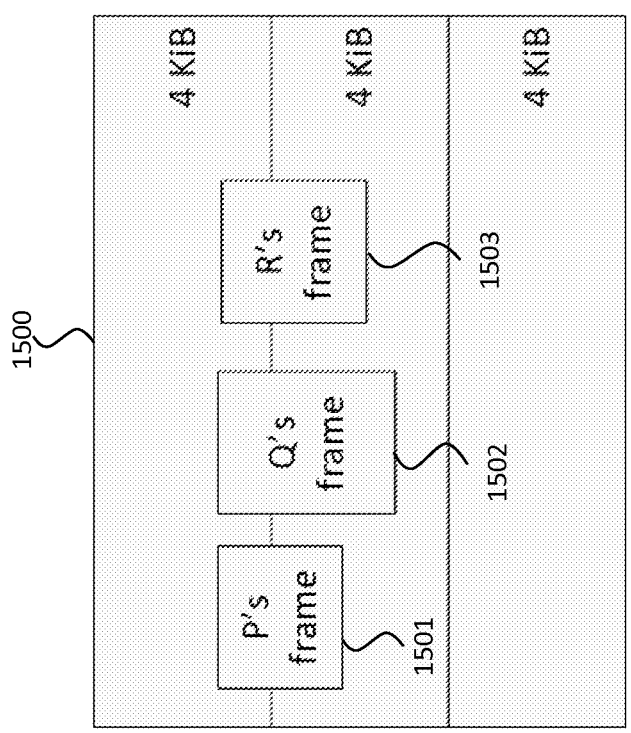
FIG. 15A illustrates how frames for procedures may be tiled in stack memory.
Figure 15B:
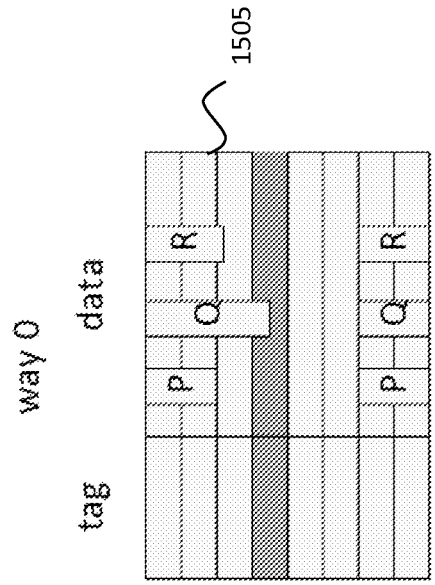
FIG. 15B illustrates how frames for procedures may be tiled in a cache.

FIG. 15A illustrates shows how frames for P( ) 1501, Q( ) 1502, and R( ) 1503 may be tiled in stack memory 1500, and FIG. 15B illustrates how they may be tiled in the cache 1505. Notably, the frames for P( ), Q( ), and R( ) are overlapping addresses, so once P( ) returns, the call to Q( ) will overwrite the very same locations just read by P( ); similarly Q( ) will read the locations on exit and R( ) will write them on entry.

Figure 16:
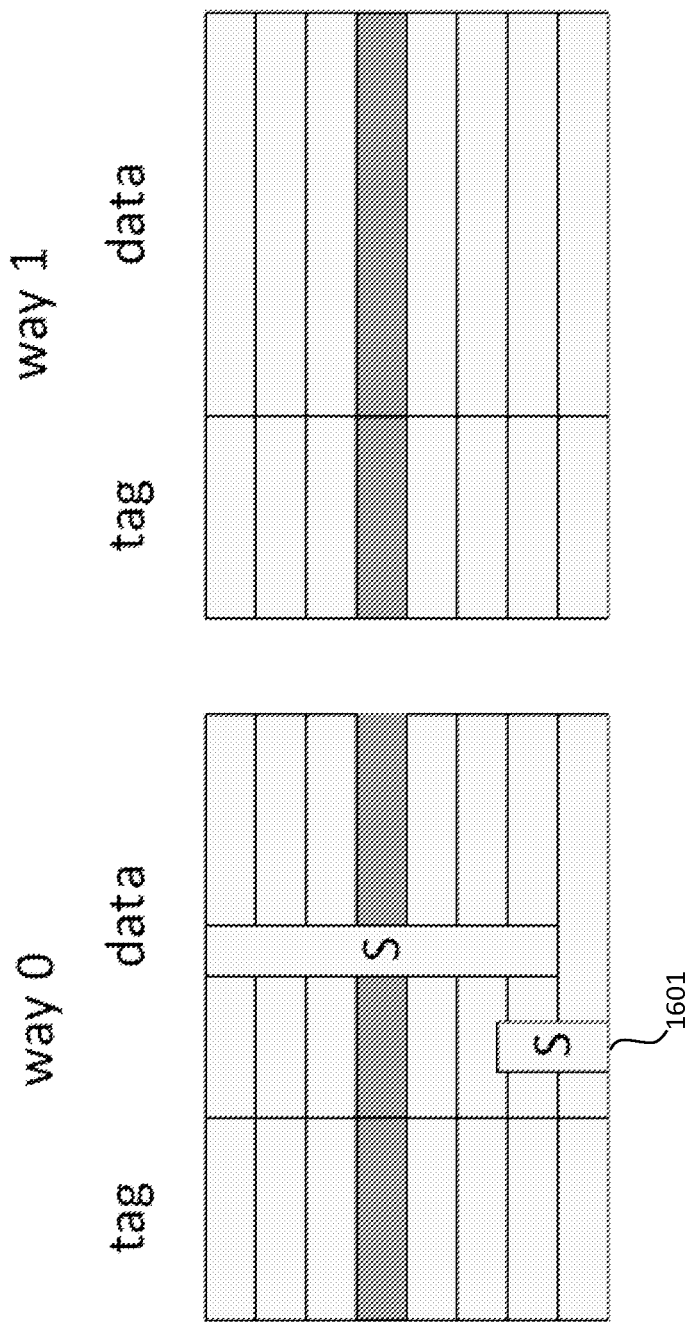
FIG. 16 illustrates how data at the top of a frame may map to the same cache set as data at the top of the caller's frame.

Stack accesses are sometimes bad candidates for way prediction, especially when they follow several patterns. First, if a procedure has a large stack frame, stack accesses can lead to way prediction conflicts. It is harmless if a general LD or ST (that is, a general load or store, and not a LD.0 or a ST.0) happens to hit in a value that was placed in way zero via LD.0 or ST.0. However, as illustrated in FIG. 16, if a procedure S( ) 1601 has a 4 KiB or larger frame, then data at the top of the frame will map to the same cache set as data at the top of the caller's frame, and if both are predicted as way 0, there will be a conflict in the cache where ordinary loads and stores do not conflict. Thus, one embodiment, the way prediction analysis logic 1305 of the binary translator 1300 monitors stack adjustments at procedure entry and avoids way prediction for large frames (e.g., frames above a specified size threshold), using ordinary loads and stores instead.

Figure 17:
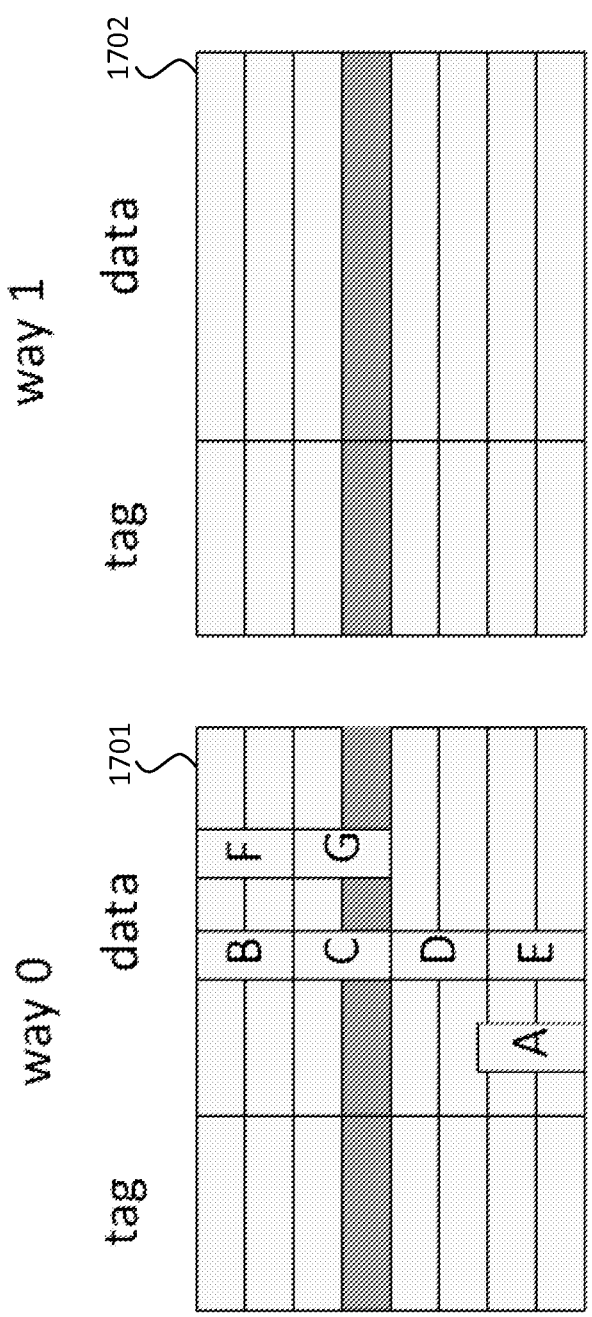
FIG. 17 illustrates how the top-of-frame for one procedure may map to the same cache set as the top-of-frame for one or more other procedures, thus giving rise to cache conflicts.

Second, even with small frames there is a chance of a deeply-nested call sequence A( )→B( )→C( )→ . . . →G( ), where the total size of frames exceeds 4 KiB. For example, the top-of-frame for G( ) may map to the same cache set as the top-of-frame for C( ) and F( ) to B( ), etc.), thus giving rise to cache conflicts. This scenario is shown schematically in FIG. 17. One embodiment of the binary translator 1300 thus also avoids way prediction when procedures nest deeply (e.g., above a threshold number of nesting levels). In one embodiment, the way prediction analysis 1305 of the binary translator 1300 builds a call graph, which can be used to find nesting cases. Indirect calls are sometimes hard to track, but may cases are optimized by the binary translator 1300 by converting indirect calls to direct calls; these cases can be considered part of the standard call graph.

Some nesting cases can be discovered on-the-fly because the binary translator 1300 typically makes use of a hardware accelerator for calls and returns; the accelerator typically has a limited size such as 16 entries; and typically traps to a binary translator handler on overflows and underflows. Many workloads have a low rate of overflow/underflow, so any with a high rate simply disable way speculation in the affected routines.

Finally, the way prediction logic 1305 of the binary translator 1300 may use performance self-monitoring to discover cases where LD.0 or ST.0 have a high rate of conflicts, and use those to selectively disable way speculation.

In general, rewriting translations is expensive. However, the special case of switching between LD.0 and LD or ST.0 and ST is straightforward provided the plain and predicted forms use sufficiently similar encoding, because the binary translator 1305 can simply overwrite one kind with the other. Further, while the predicted and not-predicted forms have different performance, both are always correct, so it is sufficient to update the code and request a "best effort" coherency on other cores running the same code; there is no need to ensure timely update on all cores, though a core with a high rate of conflicts should check for outstanding updates before promoting more LD.0/ST.0 to LD/ST.

The above describes one particular strategy for a binary translator to identify stack-pointer loads and stores that should be predicted. In general, the same general constraints apply to other memory usage patterns. For example, a routine may make frequent use of a memory array as a lookup table, translation table, etc. If the array is larger than 4 KiB, way prediction almost certainly increases conflicts compared to no way prediction; but if the array is small and used frequently it is very likely to benefit from way prediction.

To reduce resource conflicts between uses of way prediction, it may be desirable to introduce, for example, LD.1 and ST.1 which predict loads and stores for way one instead of way zero. In one embodiment, stack uses may be predicted to way zero and specific data structures to way one. Similarly, when contiguous frames can be identified, such as in FIG. 17, selected frames could use LD.0/LD.0 while other frames could use LD.1/ST.1.

A risk of way prediction is the power or performance downside because prediction is wrong too often. One way to avoid this risk is to monitor performance-losing events. Notably, performance suffers when the way is predicted but data is found in a not-predicted set; and when way prediction evicts an entry from a way which is not also LRU (least-recently-used) and thus would not otherwise have been evicted. In one embodiment, a simple performance counter may increment on these events and raise a performance event trap on frequent events. Comparing elapsed time and number of events indicates the rate. If the rate is high, way prediction is disabled. A simple scheme is to simply disable it for whatever LD.0 or ST.0 trapped. Disabling according to misprediction rates ensures performance and energy are not worse than in prior implementations.

Measurement and disabling as above does not track how often way prediction succeeded or led to performance benefits: sometimes a high rate of mis-prediction may be paid for by an even higher rate of hits that use the fast path. A more complex scheme also monitors fast-path usage (including the address), then selectively disables LD.0/ST.0 which use addresses that less often benefit from the fast path. This approach waits longer to convert LD.0/ST.0 to LD/ST and also has a higher instrumentation cost; but it may also have higher upsides.

Disabling way prediction can also be done globally, with a hardware configuration flag that indicates that all LD.0/ST.0 are to be treated as LD/ST. This ensures that misprediction "storms" can be quickly suppressed, with a later clean-up phase able to selectively disable offending LD.0/ST.0 and then reenable way prediction.

Many applications spend a significant part of their execution time in a relatively small amount of code. Based on bottlenecks, a small number of critical loads and stores will lead to a much higher number of dynamic loads and stores being way predicted, leading to improvements in both performance and energy use.

C. Fast Interpreter Hardware Support on the Data-Side

Interpretation, rather than compilation, is flexible and has low start-up overhead but is typically 100 to 1000 times slower than executing compiled code. Conversely, hardware implementation of an interpreter is inflexible and expensive.

The embodiments of the invention described below require a small hardware overhead but provide performance far better than in pure software implementations. These embodiments may be useful when employed in systems which benefit from fast interpretation, including processors based on binary translation (BT).

An "interpreter" is an engine which reads instructions in a guest instruction set (gISA), then decodes and executes them using a host instruction set (hISA). A general interpreter may be implemented as a loop such as:

(1) load raw instruction from the location indicated by the program counter (PC);
(2) decode the instruction;
(3) switch/dispatch to an instruction handler;
(4) fetch the instruction handler;
(5) execute the instruction handler; and
(6) advance the PC.

Conventional microcoded processors implement steps 1-4 and 6 in front-end hardware, which is fast but has a high hardware overhead. For example, step 1 requires a dedicated instruction cache (I$), translation lookaside buffer (TLB), and branch prediction unit (BPU). Step 4 requires a large table lookup translation (XLAT)/microcode ROM to store hISA handlers. In addition, modern processors pre-fetch instructions and utilize hardware to detect stores to upcoming instructions (e.g., self-modifying code or SMC) that have been pre-fetched. These hardware overheads can affect area, cycle time, and energy use. For example, even when only hISA is executing, circuits have leakage power and may have running clocks and other dynamic power requirements. In the discussion below, a conventional design is referred to as gISA-FE (gISA front end).

Conventional interpreters have little hardware support and are slow, often on the order of 100-1000 times slower than native execution. There are many overheads. For example, an instruction may not be a native word size and so requires several operations to fetch. Instructions may use bit-width fields, requiring multiple shift and mask operations. Encodings in one part of an instruction are often dependent on field values in some other part of the instruction, leading to sequential dependencies, table lookups, and unpredictable branches. Execution of handers is also often slow because instructions may have various exceptional cases which must be checked, and because there are many instructions (e.g., ADD, ADDC, SUB, SUBC, FADD, FSUB, VADD, VSUB, etc.), and many operands (various registers, various memory addressing modes, etc.) which lead to many handlers and high miss rates in the instruction cache.

Historical designs have hardware support such as EXEC and queues or "pipes" of values. See, e.g., Brooks, "The execute operations—a fourth mode of instruction sequencing." CACM vol. 3, no. 3, pp. 168-170, March, 1960. For example, some processors put indirect branch addresses in a register "% LINK" (from "procedure linkage"). Some implementations have a hardware queue of values called the "link pipe." See, e.g., Banning, Coon, Hao. "Link pipe system for storage and retrieval of sequences of branch instructions"; U.S. Pat. No. 6,640,297. The minimum time from writing % LINK to a branch is 5 cycles, but an interpreter writes several values to the link pipe and then perform a series of indirect branches, thus covering link-to-branch latencies.

EXEC is used in a manner in which different handler execute different sets of instructions. For example, one handler may execute ADD, ADDC, SUB, SUBC, etc. while a second handler executes FADD, FSUB, etc. Even with EXEC and link pipes, however, an interpreter is still relatively slow compared to executing translated instructions, perhaps 50-100 times slower.

Binary translation (BT) systems run on a host instruction set (hISA) and simulate some guest ISA (gISA) in order that workloads in the guest ISA can run on the host machine. Translation systems read guest instructions, generate a sequence of host instructions which have the same effect, then run the host instruction sequence. Generating translations is expensive, but they are typically cached so average overhead is small. However, always translating all instructions can lead to "translation storms" and long pauses in gISA progress. In addition, it is not always feasible to cache translations, and it is common to optimize translations for normal/common behavior and to abort on uncommon/unexpected behavior.

For these reasons, BT systems commonly use an interpreter to execute code not seen previously, self-modifying code, some corner-case scenarios, and to perform additional actions, such as collecting execution profiles to guiding translation generation.

Figure 18B:
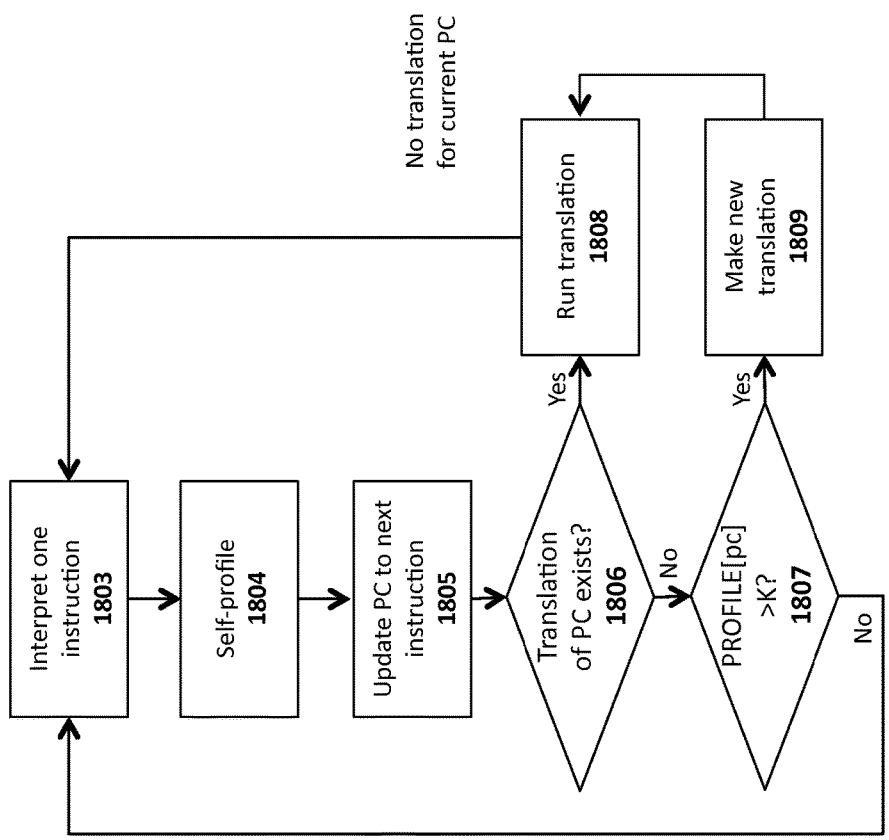
FIGS. 18A-B illustrate methods for performing translations in accordance with one embodiment of the invention.
Figure 18A:
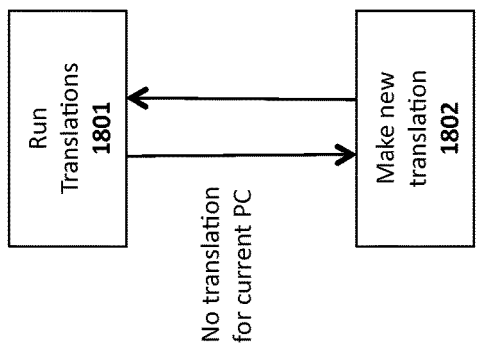

FIG. 18A illustrates a high level overview of a BT process. At 1801, hISA translations are executed until gISA is reached for which there is no translation. At 1802, a new hISA translation is performed and then resume translation execution at 1801.

FIG. 18B illustrates an overview of a practical BT process. When no translation is available for the current PC interpret one instruction at 1803. At 1804, self-profiling is performed to collect characteristics of the instruction(s). At 1805, the PC is updated to the next instruction and, if a translation of the instruction identified by the PC exists, determined at 1806, then it is executed at 1808. If not, then at 1806, if the profile indicates that a threshold has been reached (e.g., if the instruction is executed a number of times over a period of time, making it sufficiently "common") that the a new translation is made at 1809.

Figure 19:
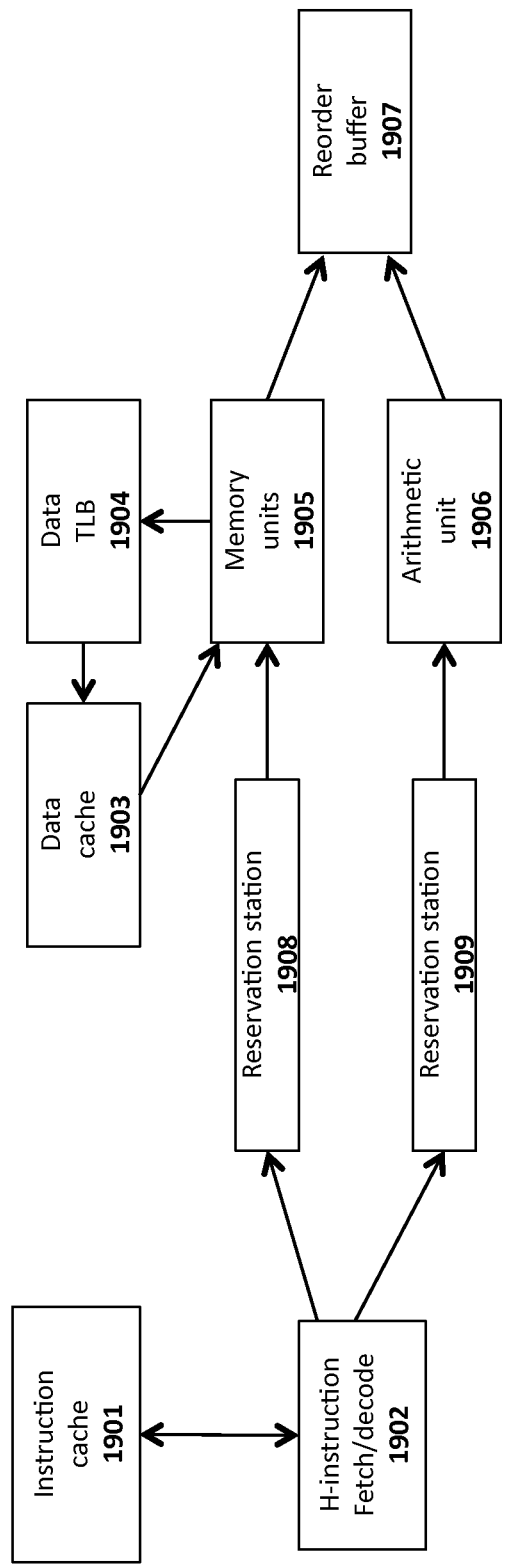
FIG. 19 illustrates the components of a prior art BT processor.
Figure 20:
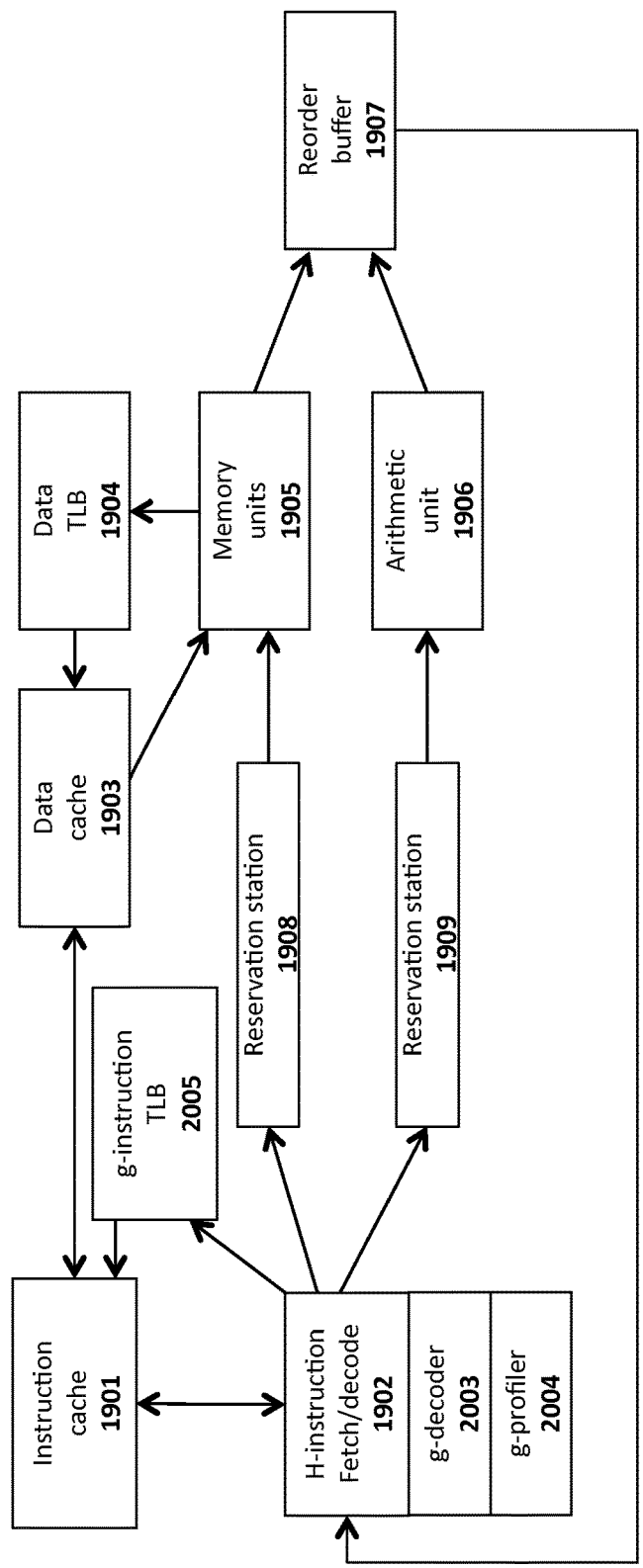
FIG. 20 illustrates components needed to add guest instruction set (gISA)-front end (FE) support.

FIG. 19 illustrates a simplified view of the components of a BT processor and FIG. 20 illustrates components needed to add gISA-FE support. In particular, FIG. 19 illustrates an instruction cache 1901, host instruction fetch/decode logic 1902, reservation stations 1908-1909, a memory unit 1905 for executing memory operations, and an arithmetic unit 1906 for executing arithmetic operations. The architecture also includes a data TLB 1904 for storing address translations and a data cache 1903 for caching data. A reorder buffer 1907 stores execution results to ensure in-order retirement of instructions.

FIG. 20 builds on the architecture from FIG. 19 to include a guest decoder 2003, a guest profiler 2004, and a guest instruction translation lookaside buffer (TLB). In one embodiment, the guest decoder 2003 decodes guest instructions and the profiler 2004 generates profile information for the guest instructions (e.g., indicating the frequency with which the instructions are executed in different contexts). In the guest instruction TLB 2005 stores logical to physical address translations for frequently accessed instructions (e.g., according to a specified cache management policy which caches frequently used translations).

In one embodiment, in addition to the guest decoder 2003, guest profiler 2004, and guest TLB 2005, the architecture requires coherency between instruction cache and data cache (as indicated by the line connecting them), and coherency between the reorder buffer 1907, instruction fetch/decode 1902, and instruction cache 1901 to ensure that prefetched instructions have self-modifying code (SMC) serviced in a timely manner. Thus, adding gISA-FE is significantly more complex than adding just decode hardware.

To address these issues, in one embodiment, the native or "host" instruction set executes routines which implement the core operations of instruction execution. A hardware front end decodes the "guest" instructions and feeds decoded information in a host-friendly form to the host code which implements the instructions. The decoder executes on the data side of the host's execution pipeline and thus avoids adding guest support to the host instruction path. Design features allow the guest decoder to frequently run decoupled and in parallel with host code execution and thus hide common-case latencies that arise when forwarding from the data side to the host instruction side. Support for multiple guest instruction sets is included by way of using a programmable decoder which is simplified by supporting common-case instructions quickly and transferring decode of corner-case instructions to software. Performance is estimated at 10× (compared to 1× for full hardware support, 100× for prior hardware support, and 1000× for no hardware support). Hardware overhead on a reduced-area core is estimated at 3% of core logic or 1% including 1st and 2nd level caches.

Figure 21:
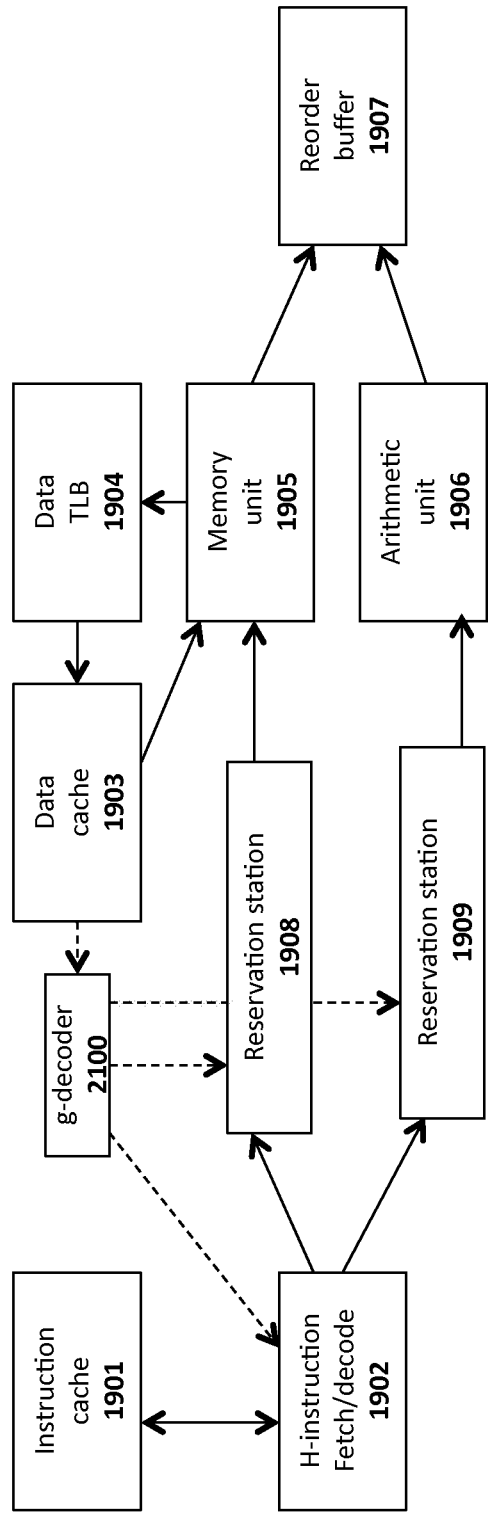
FIG. 21 illustrates how a guest decoder may be integrated within a processor architecture in accordance with one embodiment.

FIG. 21 illustrates how the guest decoder 2100 may be integrated within the processor architecture in accordance with one embodiment of the invention. In one embodiment, the guest decoder 2100 is a hardware guest instruction decoder (or just "decoder") for gISA, but retains a back-end like a conventional interpreter. The decoder 2100 uses the host data fetch mechanism, rather than a host instruction fetch mechanism as in gISA-FE. The decoder 2100 produces a host-friendly internal form which is sent, in one design, to reservation stations 1908-1909, or in a second design to special registers which are then read by an interpreter back-end in software. An implementation might support only one of the modes or both modes.

One embodiment of the disclosed architecture optimizes steps (1)-(6), above, but with lower hardware cost than gISA-FE:

Instruction fetch is performed using the data-side hardware unit, and re-uses the existing data TLB and data cache.

Instruction decode is done in hardware, with fast bit-extraction, no branches, and with more concurrency—so it is faster than a conventional software decoder. To reduce hardware, only a common subset of instructions are decoded.

Handlers are like those in a conventional interpreter and are fetched from memory, so do not need dedicated XLATs/microcode ROM.

The hardware decoder and hISA handlers are connected using queues, so the decoder and handlers typically can work asynchronously and often concurrently.

In the BT processor architecture shown in FIG. 21, the g-decoder 2100 generates "stuffed" loads to the memory unit 1905 to fetch instruction bytes; the bytes are decoded and translated to a host-friendly format. If the instruction is not-recognized, the decoder 1905 signals host software to handle the processing. If recognized, decoded information is forwarded for execution as described below. A g-decoder 2100 need not decode the entire guest instruction set. Rather, when an unrecognized guest instruction pattern is encountered, the host hardware transfers control to a BT hISA routine which executes the unrecognized pattern (e.g., via conventional interpretation). Although slower, it allows decoder simplification, and as long as unrecognized patterns are rare in the interpreted instruction stream, the performance loss is small.

Figure 22:
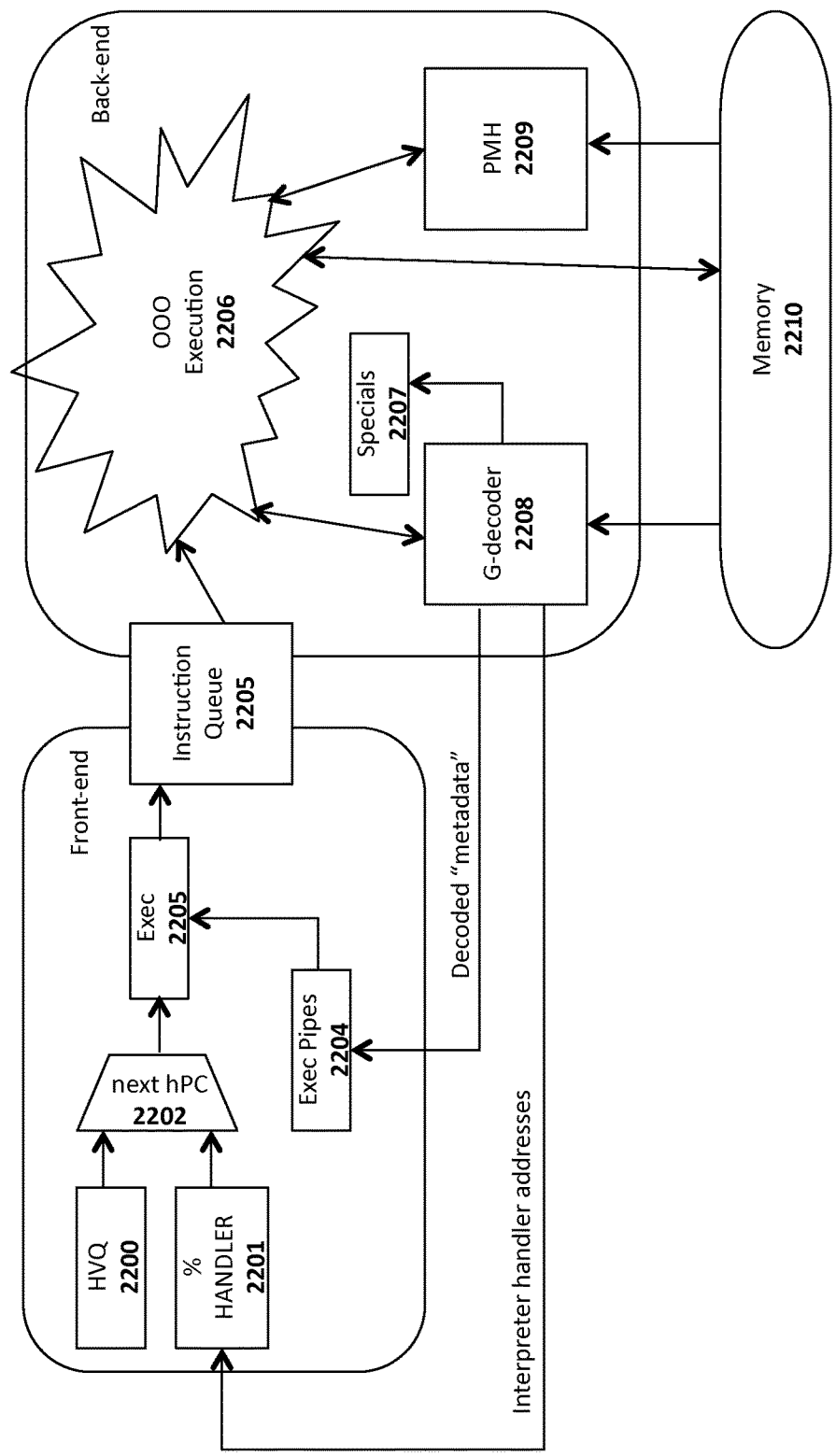
FIG. 22 illustrates another embodiment of a guest decoder integrated within a processor architecture.

FIG. 22 illustrates an alternative block diagram of one embodiment of the present invention. The g-decoder 2208 is analogous to existing page miss handlers (PMNs) in that it requests stuffed loads, which return data to the g-decoder 2208. It then forwards decoded results to the front end. Forwarding generally takes several cycles, but the g-decoder 2208 can often "run ahead" of execution, which hides the forwarding latency. Decoded results include the addresses of handlers, which are saved to a queue, % HANDLER 2201. The next-hPC logic 2202 fetches the next host instruction address either from the normal machinery (HVQ) 2200, or on a special host branch instruction (e.g., brhp), from % handler 2201. Decoded results also include opcode and operand values which are forwarded to the existing EXEC logic 2205 in the front end or to some special registers (both of which are described below). Instructions are placed in the instruction queue 2205 from which they are executed by out of order execution logic 2206 in the back end. A page miss handler 2209 may be used to perform page walk operations in memory 2210 (e.g., in response to TLB misses). As illustrated, the decoder 2208 may extracts certain specified fields from instructions and copy them to EXEC pipes 2204 in the front end and special storage regions 2207 (e.g., registers) in the back end (as discussed below).

Figure 23:
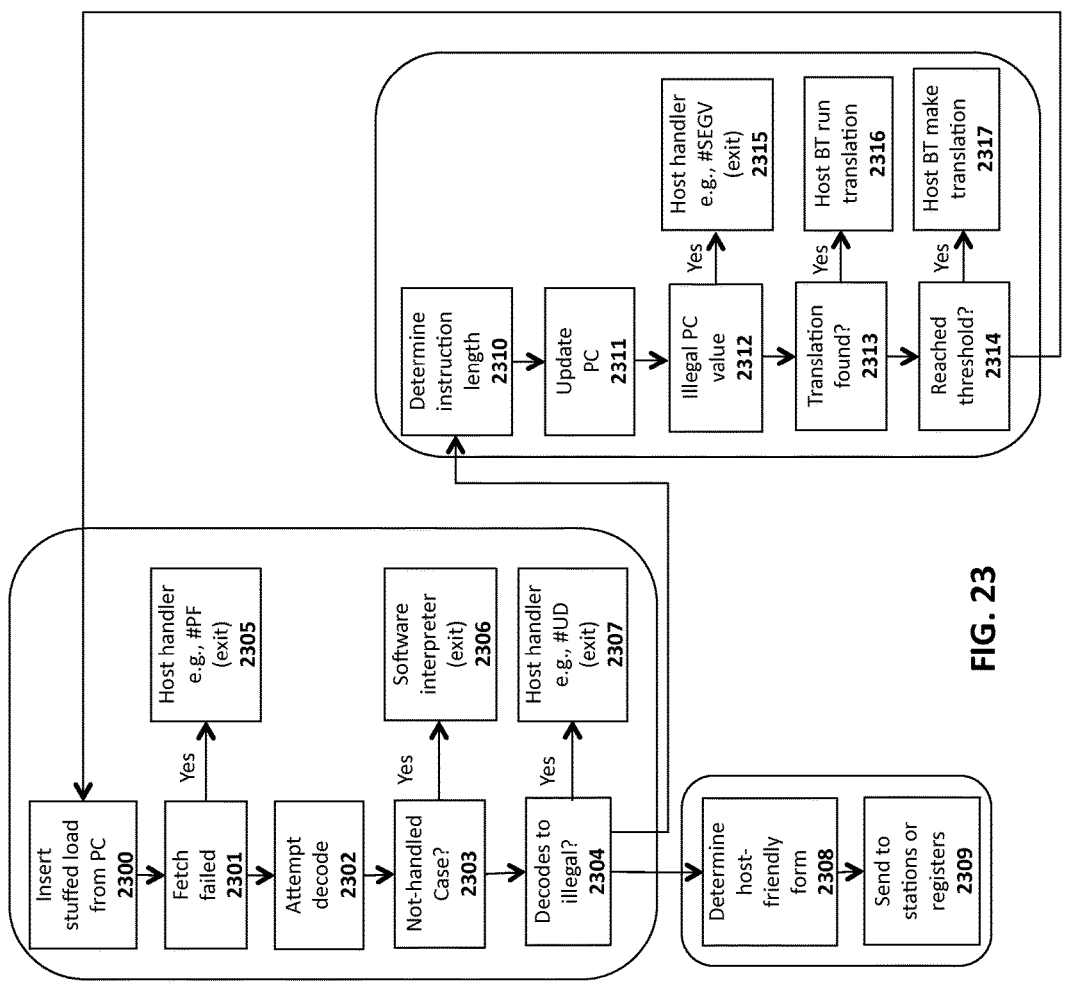
FIG. 23 illustrates a decode process in accordance with one embodiment of the invention.

FIG. 23 illustrates one embodiment of the decode process. A first group of operations 2300-2307 attempts to fetch and decode the instruction, but restarts host software if an error or not-handled case is encountered. A second group of operations 2308-2309 converts guest instruction bytes to a host-friendly form. A third group of operations 2310-2317 concurrently updates the guest program counter (instruction address) and checks conditions which either block execution or transfer execution to a host translation.

In particular, a stuffed load is inserted from the current PC at 2300. If the fetch fails, determined at 2301, then the host handler takes over at 2305 (e.g., a page fault (PF) handler). If the fetch is successful, then at 2302 an attempt is made to decode the instruction. If it is a case where the instruction is not handled, then the instruction is passed to the software interpreter at 2306. If the instruction can be handled, then a determination is made at 2304 if the instruction decodes to illegal operations (e.g., undefined instructions), then the host handler is called at 2307 (e.g., an undefined instruction (UD) handler). If not, then at 2308, the host-friendly form of the instruction is determined and sent to reservations stations and/or registers at 2309.

Operations 2310-2317 may run concurrently with operations 2308-2309. The instruction length is determined at 2310 and the PC is updated at 2311. If the PC has an illegal value, then the host handler is called at 2315. If not, then at 2313, if a translation is found, the host binary translator executes the translation at 2316. If no translation is found then at 2314 a determination is made as to whether a threshold has been reached for the instruction (e.g., based on a number of occurrences of the instruction). If so, then the host binary translator makes a translation at 2317 (e.g., to be used for subsequent instances of the instruction). If not, then the process returns to 2300.

Some cases are not shown in FIG. 23. For example, some host operations may be run that may request an exit from this process. In general, some operations shown may be handled by host software. For example, the check to determine whether a translation exists (2313) may be serviced by host software, although another implementation may cache the result (see below). Note also that FIG. 23 does not show branches. In general, "update PC" is speculative and runs ahead of execution; when execution resolves the branch target, mis-speculated, run-ahead work may be discarded.

The decoder 2208 may be guest-specific or may be programmable. Many guest ISAs have similarities, so a programmable decoder need not be fully-general. For example, there are many similarities between gISAs for ARM, MIPS, POWER and SPARC processors. A decoder that supports bit-level extraction operations may allow quick interpretation of common instructions from each ISA. Similarly, virtual machine codes for Dalvik™, Java™, Smalltalk™, and other such languages tend to be designed around fast decoding with conventional hardware, so a limited set of primitive operations may be sufficient for that class of operations as well.

In general, a programmable decoder has some overhead to switch between gISAs. Thus, one embodiment of the invention has a software interpreter for each gISA, so any ISA can be executed at any time, but a specific ISA may be accelerated.

When a decoder directly feeds hardware, there is some additional delay compared to a gISA-FE because data-side operations are decoupled from the front end (e.g., for the same reason processors usually use a separate instruction cache, instruction TLB, etc.). The delay reduces performance. However, one goal of the embodiments of the invention is to improve performance compared to prior interpretation techniques while adding only modest hardware, rather than to achieve full hardware execution speed of gISA.

When the decoder feeds the pipeline directly, decoded patterns are typically a transliteration of each guest instruction to some host internal-representation format. For example, suppose a guest instruction is ADD $RA=($RB<<2)+$RC; and suppose further that guest register $RA is stored in host register % R10, guest $RB, in host % R11, and so on. In this example, the decoder generates two entries for the ALU reservation station, one to compute (% R11<<2) and store the result in a temporary register, followed but an entry which adds the temporary to % R12 and stores the result in % R10. In addition, there may be calculations added as needed, for example to collect execution profiles.

A decoder may instead transfer output to software. The remainder of this disclosure focuses on the software transfer design, except as noted. Note a "feeds pipeline" design may use some of the same techniques. For example, this may involve calling a software routine the first time an instruction is encountered to check if a translation exists and, if not, caching that so that a subsequent invocation of the instruction need not invoke the software routine.

When decoder output transfers to software, the decoder writes internal storage which is then read by software. A simple form is a collection of fixed-function registers. For example, when the decoder reads the guest instruction ADD $RA=($RB<<2)+$RC, it writes a register % HANDLER with the address of the hISA routine(handler) that interprets the ADD instruction. Similarly, selected fields from the instruction, such as gISA register numbers, are copied to other hISA special registers. In general, "register" may be either a simple flat register or a queue of values (as described below).

Figure 24:
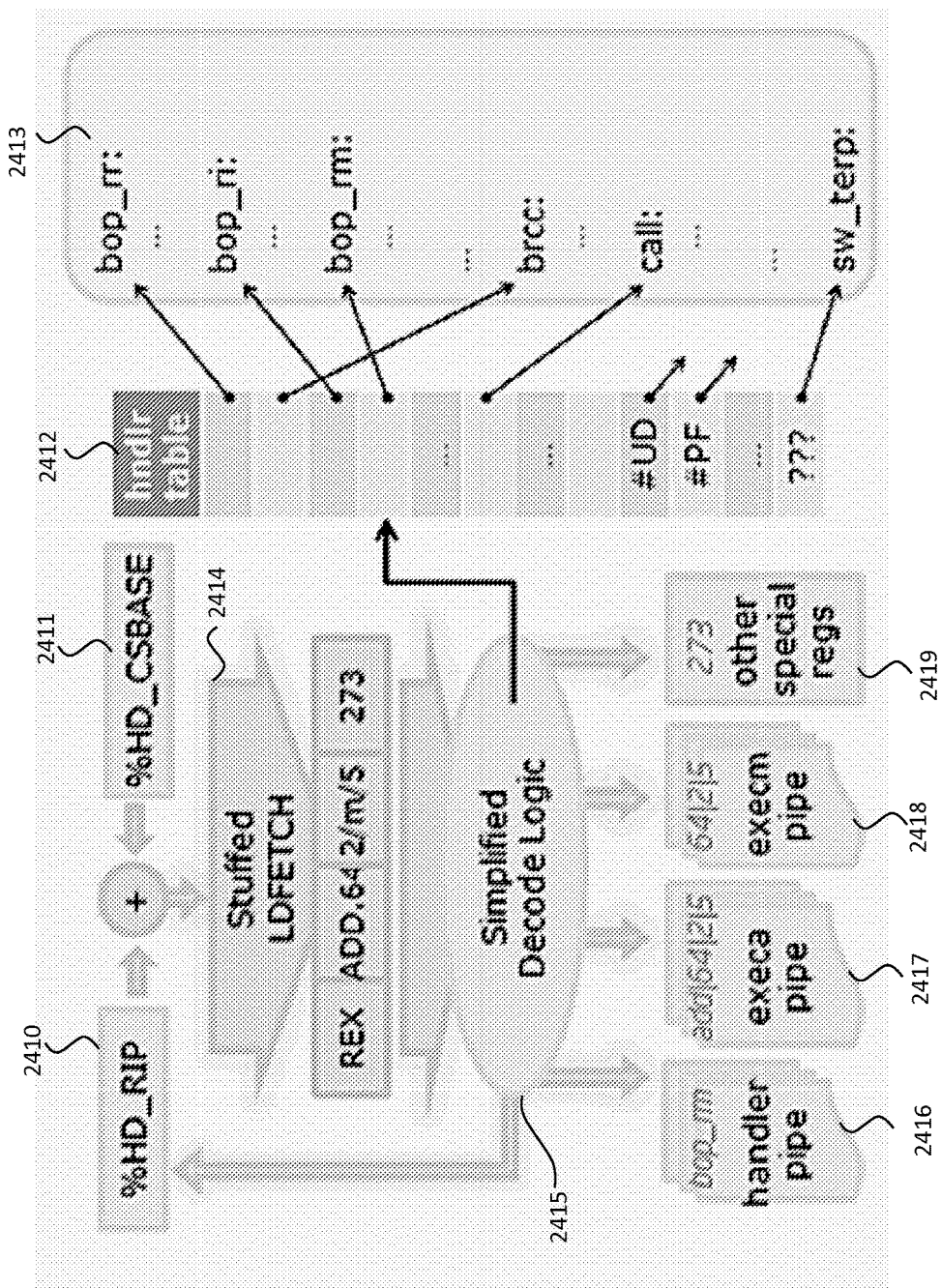
FIG. 24 illustrates decoding and processing of an exemplary guest instruction in accordance with one embodiment.

FIG. 24 illustrates one embodiment of a decoder which feeds software using simplified decode logic 2415. In one embodiment, software configures the decoder by writing a table of entry addresses 2412 which pointers to memory 2413 for software routines. Table entries match the decoder design. For example, the decoder calls table[0] for register-to-register binary operations; software is responsible for filling table[0] with the address of the corresponding software routine. To start the decoder at a specific gISA instruction, one embodiment of the invention writes the gISA PC and segmentation base and limit, and then performs an indirect branch through the handler pipe 2416. In one embodiment, the decoder operates as set forth in FIG. 23.

In the example illustrated in FIG. 24, a guest instruction REX ADD.64% R2,[% R5+273] is fetched as indicated by stuffed fetch operation 2414. The decoder determines the operation and copies the corresponding address (of bop_rm( )) from the handler table 2412 to the handler pipe 2416; at the same time it extracts various fields and copies them to the EXEC pipes 2417-2418 and other special registers 2419.

There are generally multiple handlers, and they depend on both guest and host ISAs. For example if a guest has operand shifts (e.g., ADD $RA=($RB<<2)+$RC) but the host does not, then bop_rrr( ) is used for the common case of shift=0; bop_rrsr( ) is used for non-zero shifts. FIG. 25 shows example handlers in pseudo-assembly code for a VLIW/EPIC machine having EXEC. Here, "cmit" is transactional commit, and may have additional side-effects described below. In addition, "brhp" is "branch indirect through % HANDLER pipe" and bop_rrr( ) reads the ALU opcode, operation size, and source/destination register numbers from the ALU exec pipe. Moreover, bop_rrs2r( ) is similar, but reads source0, shifts it by 2, and saves the value to a temporary, which is consumed by the second instruction.

FIG. 24 also shows that the table 2412 has handlers for various cases which exit the process as shown in FIG. 23, for example page fault (#PF), undefined instruction (#UD) and also not-decoded, cases. FIG. 25 shows sample handlers 2500 as may be used in FIG. 24.

Handlers 2500 such as illustrated in FIG. 25 may be simpler and faster than handlers in prior art interpreters, because the hardware decoder (as shown in FIG. 24) and handlers are designed together to optimize common cases. In contrast, prior systems generally need to allow for all cases. For example, x86 instructions (both IA-32 and x86-64/Intel64) may be prefixed by a LOCK byte to indicate the instruction has atomic behavior, but some instructions abort (#UD) if LOCK is provided. A prior interpreter may either (a) execute a series of conditional branches, table lookups, etc., to handle LOCK during decode and dispatch to the right optimized routine (e.g., bop_rm( ), bop_rm_locked( ), or fault_ud( )); or (b) must pass a present/absent indicator for LOCK to a general-purpose handler which then tests and dispatches on the indicator as needed. Both approaches have significant overheads. In contrast, in the system described herein, instructions with no LOCK prefix are dispatched to a no-lock handler (e.g., bop_rm( )), those that allow LOCK and have a LOCK prefix are dispatched to a lock-only handler (e.g, bop_rm_locked( ), and cases prohibit LOCK but have a LOCK prefix invoke the #UD handler (e.g., fault_ud( ).

The hardware decoder may decode a single instruction to multiple handlers. For example, on a host without EXEC, multiple handlers are run for each guest instruction. ADD $RA=($RB<<2)+$RC is decoded in to a series of handler calls read_rb_to_t0( ), shift_t0( ), read_rc_to_t1( ), alu_add( ), write_t0_to_ra( ). Using queues/pipes allows the decoder to "run ahead" by several instructions. In prior systems, EXEC pipes are advanced explicitly. That is, a given pipe entry may be used several times (e.g., bop_rrsr( ) in FIG. 25 uses execa twice). However, with a faster interpreter, explicit advance has non-trivial overhead. An improved design uses "cmit.a", where "cmit" is a transactional commit, but with ".a" added to advance the pipes.

In one embodiment, % HANDLER is used on every gISA instruction, but other registers are used only sometimes. An implementation may use queues/pipes for common values but simple "flat" registers for uncommon values. One problem with "flat" registers is handshaking is needed between the decoder and handlers to ensure run-ahead does not clobber values in "flat" registers before they are used, for example two back-to-back instructions that both have immediates, but % IMMEDIATE is a "flat" register. One approach is explicit software handshaking, i.e., when a handler is done, it explicitly tells the decoder. A second approach is that reading % IMMEDIATE acts as an implied handshake; however this may cause some handlers to have not-needed reads, while others use a value twice and therefore need to copy it to avoid premature advance. One particular embodiment includes a "flat" register plus a queue of 1-bit values to indicate the logical position of the flat value. "Cmit.a" advances all queues including 1-bit queues for flat registers; when the logical position drains, the flat register may be written by the decoder.

A decoder can "run ahead" of execution, so conditional branch direction is not always known and thus the decoder does not "know" which instruction to decode next. A similar problem exists for indirect branches. One approach is to simply block decode at control-flow instructions until the software handler determines the branch target and tells the decoder. One embodiment decodes using a speculated (predicted) branch direction; when the software handler runs, it writes a special register % TAKEN to tell the decoder the final branch resolution. The decoder then discards misspeculated decode results, but on correct speculation the register queues are already filled for the next instruction.

Existing systems compute the guest program counter explicitly. One embodiment of the invention updates the program counter in the hardware decoder, which reduces work for software handlers. When the guest program counter is needed (CALL, PC-relative addressing, traps/interrupts, etc.), it is read via the special register % G_PC. Branches need not generally compute the successor PC, as it is already computed by the decoder. In a BT system, it is advantageous to profile branch taken/not-taken histories to guide later translation region formation. In one embodiment of the invention, the address is read from % G_PC as shown in FIG. 26.

FIG. 26 illustrates sample handlers as would be used in FIG. 24, showing pseudo-code in a mixed high-level language and assembly as in FIG. 25. Routines such as read_flags( ) read a value from a hardware register. The routine brcc_eq( ) executes a conditional branch and tells the g-decoder via write_taken( ) whether the branch was taken. br_target_profile( ) executes with the gISA instruction following the branch to record instruction profiles.

An interpreter for a BT system maintains execution counts for each branch target. When a count reaches some threshold, the BT system creates a translation for the code. In prior systems, the interpreter computes the branch target explicitly, and branch routines update profiles for the branch targets. In one embodiment of the invention, the decoder inserts two handlers for a branch: one for the branch itself (e.g., brcc_eq( ) in FIG. 26) and a second handler that runs after the branch, using the program counter of the branch target (e.g., br_target_profile( ) in FIG. 26).

Sometimes, a guest instruction sequence performs a store to memory then executes the modified location, often called "self-modifying code" or SMC. Because a decoder can "run ahead" of execution, a location may be fetched and decoded before it is modified, and thus the wrong thing has been decoded. One embodiment of the decoder includes a small hardware structure to match inflight run-ahead against store addresses, e.g., the start addresses of two cache lines. A store to an overlapping address causes the decoder to discard all "run ahead" results and restart. Where the processor already includes matching hardware for other reasons, such as alias hardware (used in prior BT processors), the existing hardware may be used for this purpose.

Interrupts are asynchronous control flow at guest instruction boundaries. Prior interpreters poll at guest instruction boundaries or disable interrupts except in a "window" at guest instruction boundaries. The faster the interpreter, the greater the relative overhead of such strategies. Our design runs on a host with transaction hardware (e.g., cmit), and is improved to optionally poll for interrupts at transaction commit. Where a guest architecture has implied interrupt disable after some instructions (e.g., an x86 "move to stack segment" instruction), the interpreter sets a flag to disable the next polling event. Nested disabling is flagged for special handling.

In a BT system, interpreter execution periodically checks for a translation which can be run instead of interpreting. For example, a translation may begin at the third instruction of a 5-instruction sequence. In general, an interpreter must check at every instruction. As the cost of interpreting is reduced, the relative overhead of checking grows. One embodiment of the invention alternately writes % HANDLER with the address of a handler, e.g., bop_rrr( ), and the address of a translation-find routine, e.g., tfind( ). For example, the guest code at 2701 in FIG. 27 causes % HANDLER to be written with the alternating sequence at 2703 in FIG. 27.

Figure 27:
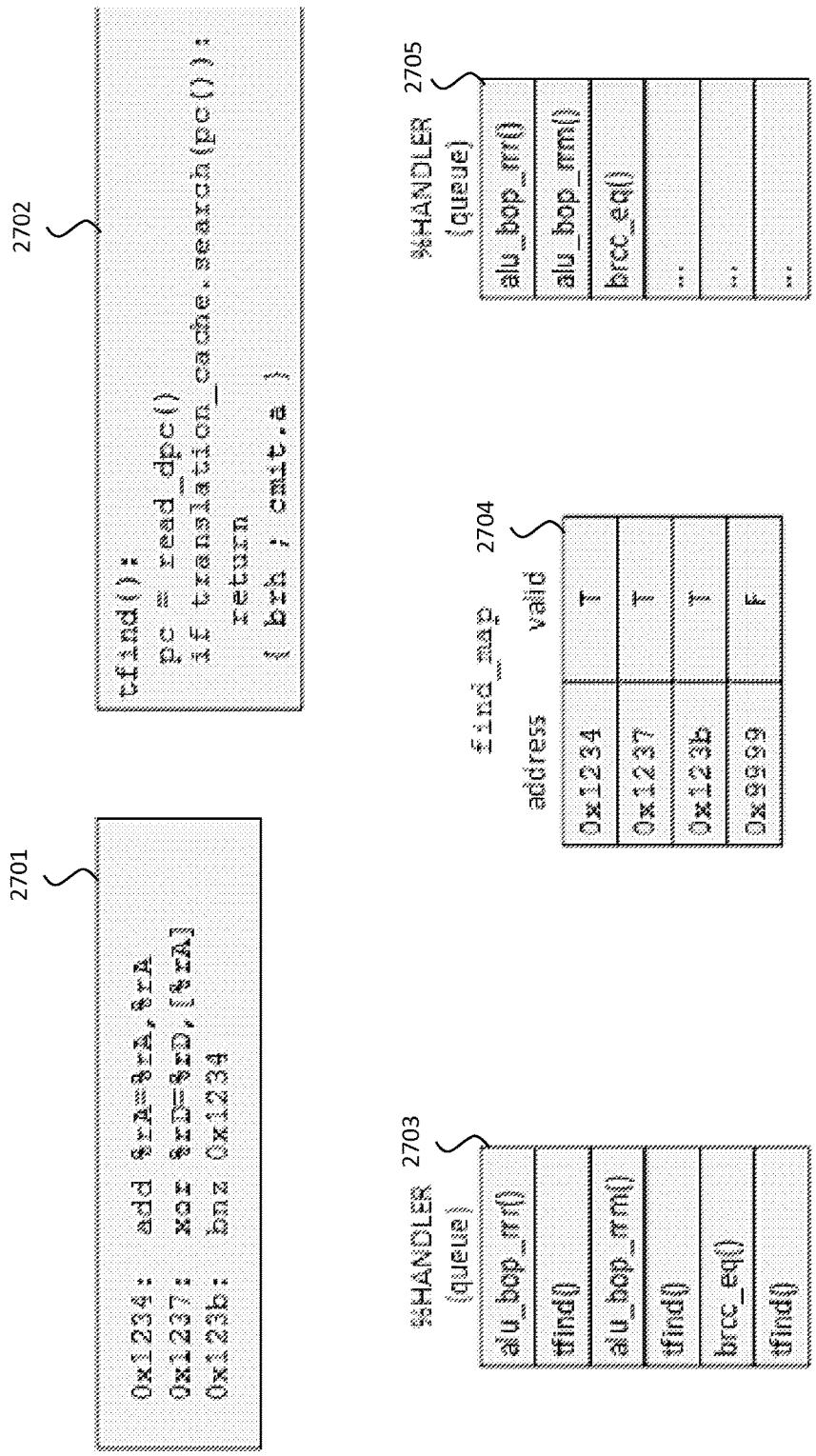
FIG. 27 illustrates guest program code and other associated code and hardware for performing more efficient guest translations.

Execution in a loop may cause tfind( ) to be called needlessly. For example, in 2701, if the first loop iteration finds no translation for 0x1234, then there is never a translation on following iterations, until the interpreter exits and the translator runs. One embodiment of the invention keeps a cache of "has been checked already" guest PC values. Once tfind( ) is called for an address it is not called again until the BT system explicitly invalidates the cache. In FIG. 27, 2704 shows an example cache, and 2705 shows % HANDLER on the second iteration of the loop, with no tfind( ) calls inserted.

In summary, FIG. 27 illustrates faster checking for guest translations. Specifically, 2701 shows a sample gISA code fragment; 2703 shows the sequence of handlers produced by the g-decoder (note a call to tfind( ) between every gISA handler); 2702 shows tfind( ), which looks for a translation and either exits to the translation or continues with gISA interpretation; 2704 shows a hardware structure which is updated each time tfind( ) returns, indicating that tfind( ) has already been called for this location; and 2705 shows the optimized sequence that is executed on subsequent interpretation of the gISA fragment a( ), with tfind( ) calls omitted. When the translator builds new translations, or on selected other conditions, the structure at 2704 may be invalidated by BT software.

Although the above describes decode hardware as beneficial to an interpreter, it can also benefit a "quick" translator. A quick translator may generate low-quality code, but can do so faster than a more-optimizing translator and thus avoid some performance problems for low-repeat code. In a "quick" translator, instruction decode cost may be a significant part of the total cost of translating. As with an interpreter, the decoder disclosed here can be decoding the next instruction concurrently with the translator running on the previous instruction, so the effective decoding cost may be near zero. In one embodiment, to build a translator, the "hndlr table" 2412 in FIG. 24 is replaced with a table of pointers to routines that emit code. For example, bop_rrr( ) may be replaced with emit_ bop_rrr( ), which instead of performing the ALU operation reads the execa queue values and generates a host sequence that simulates the indicated instructions.

The embodiments of the invention described herein may be employed within any cross-ISA processor such as a processor that non-natively executes x86-64/Intel64 program code, or an x86-64/Intel64 processor that can also execute other ISAs. In addition, these embodiments may be used in same-ISA BT, for example when BT is used to annotate code to collect performance counters, to perform invariant checks for debugging, and in various other applications.

D. Out-of-Order Retirement Invisible to Software

Long-latency operations, such as cache misses, hold physical registers and other resources of already-completed operations in order to retire instructions in-order. Out-of-order retirement frees resources sooner and allows higher performance or smaller structures, but if reordering is visible to software, it changes the programming model. Some prior approaches hide out-of-order retirement but rely on adding other hardware structures.

The embodiments of the invention described below reuse transactional commit/abort that is already present in some processors to allow out-of-order retirement within a transaction, and thus provide out-of-order retirement with very low added hardware cost.

Many existing processors use out-of-order execution to improve performance; but at the same time use in-order retirement of completed instructions. In-order retirement has the advantage that the programmer has a familiar and predictable programming model, but the disadvantage that sometimes significant processor resources are held "just in case" an earlier instruction takes a trap, fault, or other uncommon event that requires discarding later instructions which have completed but not retired.

Holding resources is a problem because performance is frequently limited by available resources. Building more resources often has significant disadvantages, such as forcing slower processor cycle time, increasing manufacturing cost, or negatively impacting execution power and energy efficiency. Holding resources for in-order retirement is especially unfortunate as it is an example of doing something for the rare case (exceptions) which hurts the common case (normal execution).

FIG. 28 illustrates a sample code fragment 2801 and the corresponding entries 2802 in a retirement order buffer and resources that will be freed when the instruction retires. In particular, the illustrated example uses register renaming from logical registers (e.g., % rA, % rB, etc.) to physical registers (e.g., PR29, PR57, etc.) and a retirement order buffer (ROB) so that program operations can execute based on dataflow dependencies rather than waiting for all earlier instructions to complete. In the sample code fragment 2801, B: depends on a load at A:, but C:, D:, and E: can execute independently. The ROB entries 2802 indicate actions to perform when the instruction retires. Notably, B: holds a reference to the earlier version of % rA, stored in PR29. When B: executes, it writes the result to some other physical register, when B: retires PR29 is freed. Conceptually, E: is independent of B: and C:, but if there are no free physical registers, then E: cannot allocate a destination register to write the new value of % rD, so cannot issue (get queued to execute) or execute until some earlier instruction retires and frees a physical register. In this example, C: might have already executed, so in principle PR57 could be released, but in existing processors, C: cannot retire and release PR57 until A: and B: have retired.

In an out-of-order retirement system, when an instruction completes, it is retired and resources freed even if earlier instructions are still in-flight. This offers a performance up-side, but potentially at significant cost to the programmer. For example, the ROB 2802 in FIG. 28, if C: retires before A: and B:, there is a risk that A: will take, for example, a protection fault (no load permissions) and transfer control to a fault hander, at which point % rC has a value which has been incremented as if B: finished. In this example, software in the fault handler could conceivably reconstruct the earlier value of % rC, but, in general, some operations are destructive and so it is not always possible to reconstruct pre-retire state.

In some cases, loss of exact state is acceptable. For example, if a permission fault is going to terminate the application, then it does not matter if % rC has the pre-increment or post-increment value. However there are many examples where it does matter. For example, if A: takes a page fault and the operating system reads in the page and restarts the program, it is vital that A: gets re-executed, and equally vital that C: does not. Sometimes, even if out-of-order retirement does not directly introduce errors, practical considerations wind up hurting performance. For example, some prior machines employed a programming model for floating-point code that was (or was like) out-of-order retirement in order to improve peak performance. However, practical systems built using this prior floating-point code often had many "barrier" operations to ensure program ordering, and the barrier operations had the net effect of hurting performance compared to a more conventional model.

Other prior systems have suggested implementing out-of-order retirement but using additional structures to ensure the software programming model is as-if the machine implements in-order retirement. See, e.g., R. Ubal, J. Sahuquillo, S. Petit, P. Lopez, D. R. Kaeli. *A Seqentially Consistent Multiprocessor Architecture for Out-of-Order Retirement of Instructions*. IEEE transactions on parallel and distributed systems, V23 #8, 2012/08, pg. 1361-1368. For example, once the load A: in 2801 is guaranteed to complete, the following independent operations may be retired even if the load and dependent operations have not actually completed, since there are no longer conditions which prevent completion.

One embodiment of the invention takes advantage of transactional commit/abort functionality already present in some processors to allow out-of-order retirement within a transaction, and thus maintain the software view of in-order retirement. At the same time this embodiment provides for out-of-order retirement at very small added hardware cost.

Specifically, in one embodiment, the transactional checkpoint/restart hardware of a processor is used to implement out-of-order retirement and at the same time ensure software sees only in-order retirement. Periodic transactional checkpoints may be performed. Following a checkpoint, out-of-order retirement is allowed and thus early resource reclamation. If an event requires in-order retirement (e.g., a trap, fault, etc.), the transaction is aborted and restarted, but with in-order retirement. This requires little hardware support beyond the existing mechanisms.

Figure 29:
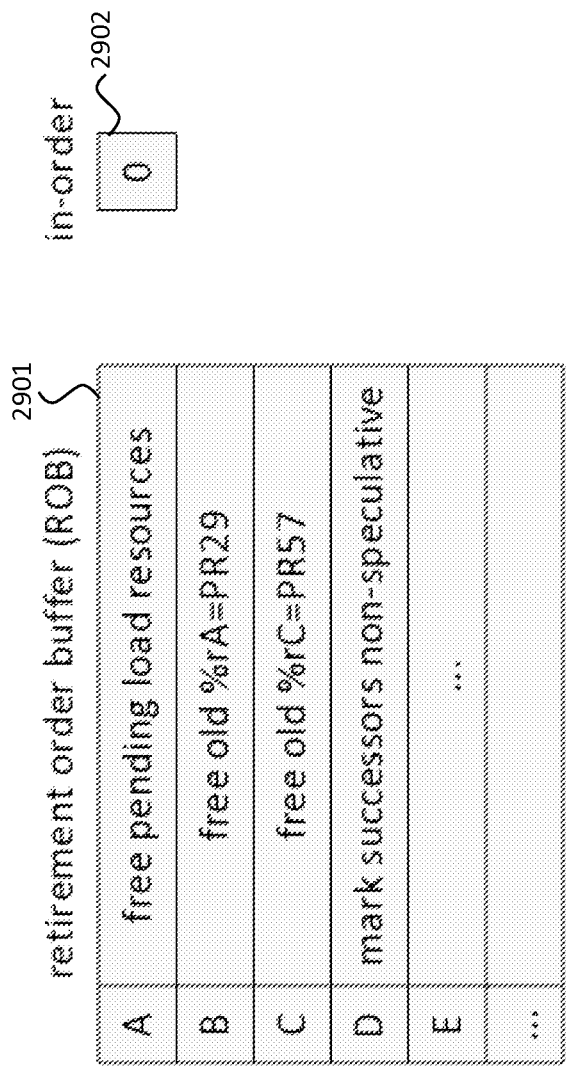
FIG. 29 illustrates improved hardware that includes an "in-order" indicator to control when out-of-order retirement is allowed.

FIG. 29 illustrates improved hardware that includes an "in-order" indicator 2902 to control when out-of-order retirement is allowed. Transactional hardware is well known and is not described here in detail to avoid obscuring the underlying principles of the invention. In one embodiment, if in-order 2902 is set, retirement is conventional. If in-order 2902 is clear, then when a ROB entry 2901 is marked as complete, it is retired immediately rather than waiting for earlier instructions to complete.

Thus, using the same coding example shown in FIG. 28, C: is allowed to complete out-of-order, free PR57, and thus allow E: to issue and execute. If A: completes normally, then execution proceeds normally. If A: takes a fault then the transaction is aborted, causing % rC and all other modified resources to be returned to their values at the time of transaction start, and the "in-order" indicator 2902 is set to disallow out-of-order retirement.

One potential problem is exceptional events and the instructions leading up to them now need to be executed twice: once to discover the presence of an exception, and a second time to reconstruct in-order state for exception delivery.

As a first consideration, out-of-order retirement does not introduce exceptional events, but merely makes them more expensive to deliver. As a second consideration, the practical problem with increased exception cost is not the cost of a single exception, but rather the cost of many exceptions over time.

Thus, one embodiment of the invention uses a second mechanism to allow out-of-order retirement in code where exceptions are rare, and forces in-order retirement where exceptions are common or where it is unknown if they are common or rare. Two mechanisms are described, one for a processor based on binary translation (BT), and one for a conventional non-BT processor.

1. BT Mechanism

In Binary Translation (BT) architectures, some guest instruction set architecture (gISA) is executed by converting or "translating" gISA sequences to equivalent host (hISA) sequences, then executing the hISA code. The hISA sequences are typically called "translations." BT processors typically implement transactional support to allow the BT system to reorder operations (e.g., out-of-order issue). If all goes as planned, the transaction commits. If an exceptional circumstance is encountered, the transaction aborts and the BT system executes the gISA instructions more carefully to either avoid the exception on re-execution or deliver it precisely to gISA state.

In a BT processor based on transactions, there is some instruction or other indicator that tells hardware to commit a prior transaction and start a new transaction. This is referred to as "commit." In one embodiment, the commit encoding is augmented with a bit to indicate whether retirement for the next transaction is in-order or out-of-order. We call this bit "ordered retirement" or ".OR".

FIG. 30 illustrates sample gISA code 3001 from FIG. 28, a sample translation 3002 using in-order retirement, because commit.or is one, and a sample translation using out-of-order retirement 3003, because commit.or is zero. Note that gISA operations may be reordered by the BT system and % rD is updated speculatively, before the branch; but in the event of a fault by the hISA ld at x:, the hardware fault model is nothing because x: has completed; and the BT system is responsible for reconstructing the gISA state.

Turning to the sample translation using out-of-order retirement 3003 (e.g., because commit.or is zero), in the event that the ld at x: faults, it is undefined whether % rC has the pre-increment or post-increment value, and similarly undefined whether % rD has been updated. In one embodiment, on a fault, the BT system rewrites 3003 to be like 3002, performs a transaction abort to reset state to the values as-if w: had just executed, then restarts execution at x:. This time, the transaction executes in-order and when the load faults, delivery is in-order.

As a further improvement, in one embodiment, the hardware may have a second in-order "override" bit that has a transient effect (e.g., until the next commit). This allows the BT system to avoid rewriting the commit instruction (which may have further overheads such as invalidating and re-fetching instructions from the instruction cache), and also allows the BT system to more naturally monitor the rate of faults to avoid over-eager conversion of .or=0 to .or=1.

As noted above, code which executes frequently pays the price of executing everything twice. To avoid this risk, one embodiment of the BT system initially generates translations so every COMMIT has ".OR" set to in-order retirement. This default avoids double-execution in the presence of faults.

Periodically, the BT system changes one or more ".OR" bits to out-of-order retirement. On a following fault, the BT system could immediately return to in-order retirement. In practice, some operations fault occasionally but not frequently and it is advantageous to revert to in-order execution only if the fault rate is high. Thus the BT system may monitor the fault rate and revert to in-order only when faults are frequent.

As a specific example, existing BT processors already record the address of the last commit executed, and on an exceptional event (such as a faulting load) transfer control to the BT software in order to resolve the fault. Thus, the BT processor may find and examine the commit preceding the fault and, in turn, may maintain a table of commit.or=0 operations that precede faults and keep a decaying average of the interval between faults. If the decaying average goes above some threshold, the BT software sets commit.or=1 for that specific commit.

2. Hardware-Based Techniques

A hardware mechanism need not be used with a BT system. One embodiment includes a predictor for when to use out-of-order retirement. As with the BT mechanism described above, it should ideally predict three cases:

Actual behavior is not-known, so predict "in-order"
Actual behavior is known and has a low fault rate, so predict "out-of-order"
Actual behavior is known and has a high fault rate, so predict "in-order"

Many different embodiments are possible. In one embodiment, there is a predictor structure like a branch predictor which is accessed on a transaction start, transaction commit, and transaction abort. These are analogous to branch seen, branch taken, branch not-taken. The structure may differ in detail from a branch predictor. For example, it may be advantageous to have fewer entries but each entry has more history. Any transaction start that is found in the structure and is marked as strongly predicted to eventually commit can use out-of-order; any transaction start that is not found or which is found but not strongly predicted to eventually commit uses in-order.

It may also be feasible to use the existing branch predictor hardware for in-order/out-of-order prediction. This may have advantages both that the effective capacity is shared (no separate structure) and that branches leading up to transaction entry may affect transaction exceptions, so including the branch prediction information can help transaction order prediction.

Figure 31A:
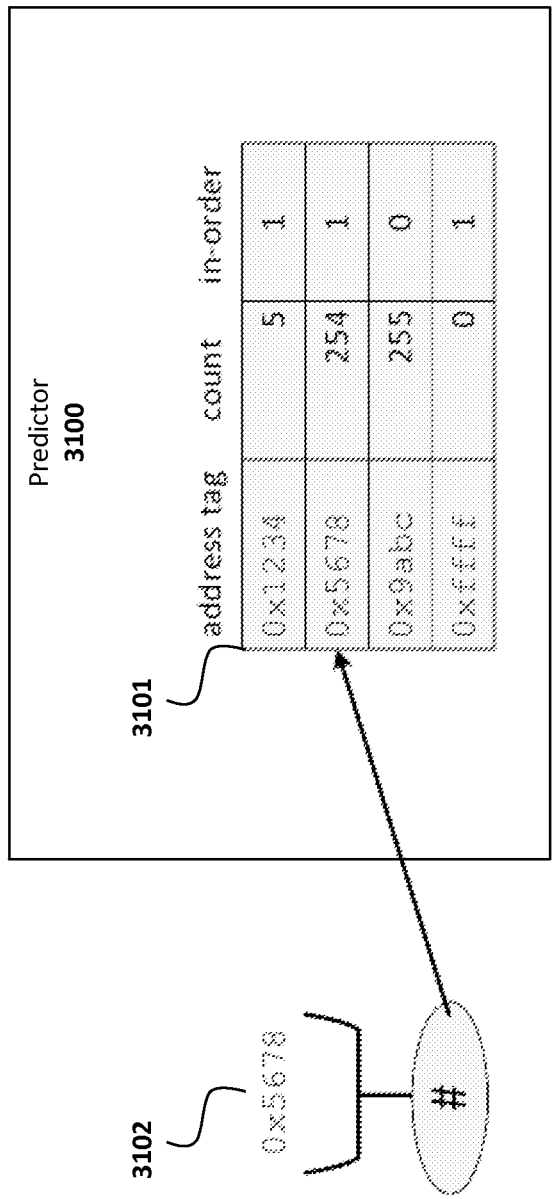
FIG. 31A illustrates a predictor in accordance with one embodiment of the invention.

A predictor 3100 in accordance with one embodiment of the invention is illustrated in FIG. 31A which includes a data structure 3101 that holds an address tag, an N-bit "count" field (e.g., implemented using counters), and 1-bit "in-order" field. In one embodiment, when transaction start is reached, the address 3102 is hashed and looked up in the data structure 3101. On a tag mismatch, the tag may be entered in the structure, the corresponding counter zeroed, and the "order" field set to "in-order" (e.g., using a value of 1). On a tag match, if "order" is "in-order," the counter may be incremented. If a specified threshold is reached, the "order" field may be set to "out-of-order" (e.g., using a value of 0). In one embodiment, the last-used "transaction start" entry is retained until the next translation commit or exception. On an exception, the last-used entry has "order" set to "in-order" and the counter is zeroed. This means that, at most, every $2^N$ invocations need to be re-executed. A more conservative design may leave the counter saturated but sets in-order, forcing in-order execution until the address is evicted from the predictor.

Figure 31B:
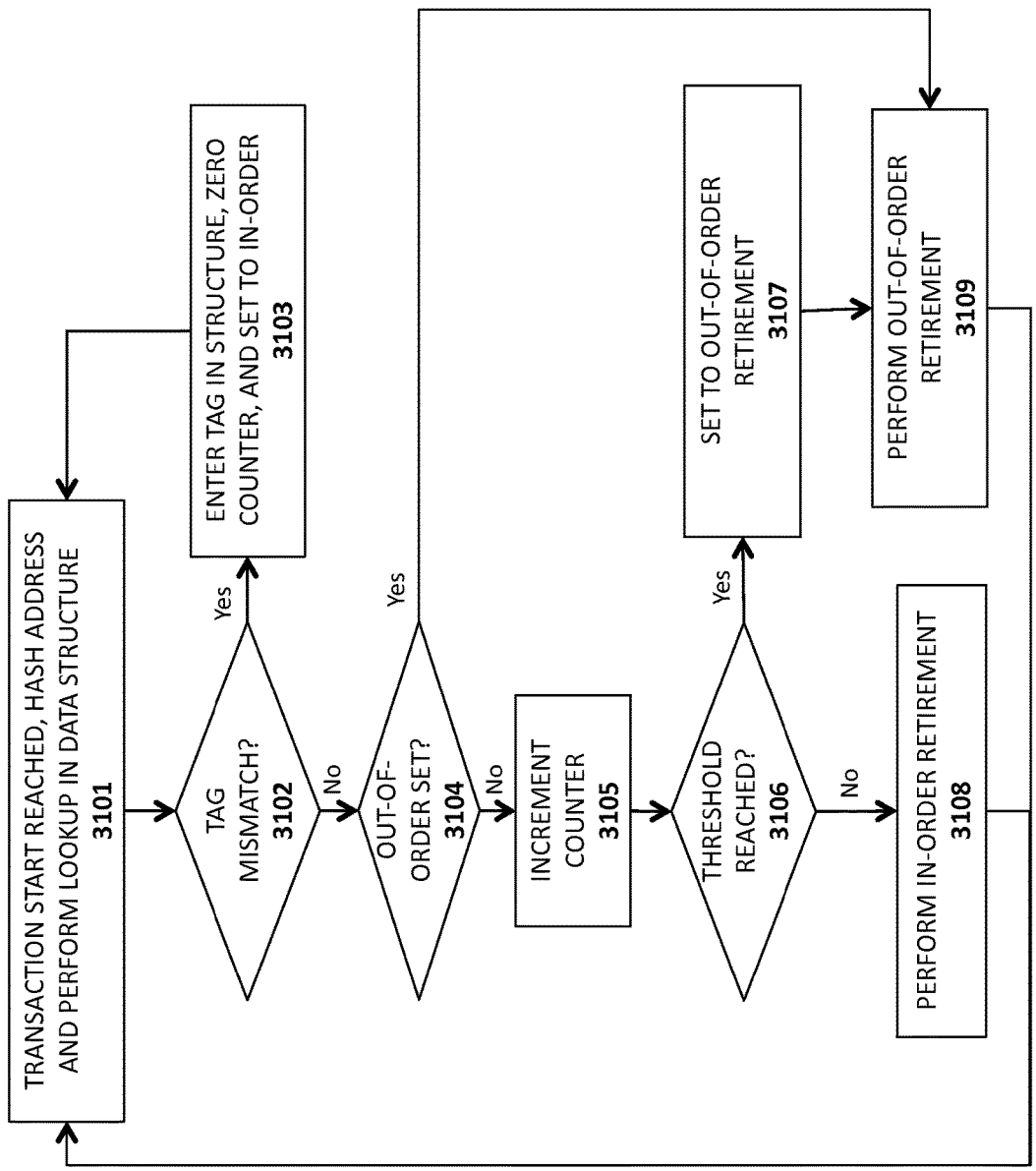
FIG. 31B illustrates a method in accordance with one embodiment of the invention.

A method in accordance with one embodiment of the invention is illustrated in FIG. 31B. At 3101, when the transaction start is reached, the address is hashed and looked up in the data structure. On a tag mismatch, determined at 3102, the tag is entered in the structure at 3103, the counter is zeroed, and "order" set to "in-order." On a tag match a determination is made as to whether "order" is set to "out-of-order" or "in-order." If the former, then at 3109, out-of-order retirement is performed at 3109. If the latter, then the counter is incremented at 3105. Once a specified counter threshold is reached, determined at 3106, then the "order" is set to "out-of-order" at 3107 and out-of-order retirement is performed at 3109. If not, then in-order retirement is performed at 3108.

One embodiment of the invention uses a second counter to allow some number of exceptions to be processed before switching to in-order; or switching immediately to in-order but setting a counter value so a few further successful transactions will switch back to out-of-order retirement.

Note that in one embodiment, transaction aborts are not treated as exceptions. A transaction abort needs to recover state from the beginning of the transaction, but does not need to re-execute in-order.

The BT system described above uses transactions for most execution. Other processors supporting transactions are typically indicated explicitly in the instruction stream or implied by certain sequences. The simplest approach is to use out-of-order retirement only for sequences already identified for transactions.

An improvement is to use transactions even where they are not needed to satisfy guest behavior. It is typically safe to start transactions at arbitrary guest instructions (a BT system typically does just that), so it is correct to "guess" where to start transactions. Some actions, such as sharing, may force a transaction abort, so it is useful to have a predictor for when and where to start transactions. The predictor schemes above can be extended to support this feature. For example, the predictor 3100 in FIG. 31A can predict where to start transactions by using the end of one transaction as the start address for a successor transaction (as in a BT system). Once a transaction has started, the system may proceed for N instructions then declare end of the transaction. The up-side of ending a transaction is it limits the cost of rollbacks and reexecution, and it reduces the risk of, for example, sharing-induced rollbacks. The downside of ending a transaction is that it bounds up-sides from out-of-order retirement.

Exception rates for most transactions is very low, much less than one in a million, so a mechanism such as described above can quickly identify most good candidates and quickly reject most bad candidates, while keeping very little other state. Thus, the potential performance down-side is very low.

E. Decoupled Load Retirement in an Atomic OOO Processor

Modern out-of-order (OOO) processors use a memory order buffer structure to track the OOO execution and OOO completion of memory load and store operations. Load operations are tracked by a Load Buffer (LB) and store operations by a Store Buffer (SB).

A LB may be implemented as a Ring Buffer. Load operations are assigned to LB entries in program order at allocation stage. LB entries are de-allocated at retirement or aggressively upon completion if no intervening conflicts exist. Functional constraints exist such as fencing operations which require a late de-allocation at retirement. With the introduction of atomicity the de-allocation at retirement has become more critical. Load operations in atomic regions need to be kept upon retirement as updates to status bits assigned to lines within the data cache have to be processed at or after retirement. The size of the LB limits the number of Load operations within the OOO execution window and thus directly the performance of the processors. Atomicity can be used to execute code which has been speculatively optimized (e.g., by a Dynamic Binary Code Optimizer). In this case, all load operations in atomic regions are part of very frequently executed code sections.

All LB entries have equivalent fields and support the same operations. As any entry can be in any state, processing functionality has always to be applied to all entries of the LB. With increasing the number of LB entries, the timing requirements of processing circuits are more critical. While all data fields do not have to be tracked during the complete lifetime of a Load operation, they do exist for all LB entries. This results in roughly linear silicon area growth when increasing the LB size. While processing memory operations, multiple data fields of an LB entry are updated at multiple different stages within the processor pipeline. This requirement prevents the aggregation of data fields to common universal memory structure with common ports.

One embodiment of the invention includes a Complete Load Buffer (CLB) which increases the number of load operations in the OOO window without conventionally scaling up the LB structure itself. In contrast to the known solution of scaling up the LB structure, this embodiment of the invention uses a CLB to track load operations between completion and retirement.

Numerous benefits are realized by these embodiments including a reduction in critical timing requirements, smaller footprint, and the ability to utilize standard memory buffing. For example, in one embodiment, load operations not completed are handled by the LB and completed load operations by the CLB. Thus, processing circuits to control and check the completion of load operations need to be applied only to the entries of the LB not to the CLB. Consequently, timing requirements are less critical as they would be with checking a LB with the size of both buffers. However, the number of Load operations inside the OOO execution window can rise up to the number of entries of LB and CLB.

Moreover, not all data fields of the LB are required at retirement. Thus, in one embodiment, if a load operation completes, only those data fields which are still required until retirement are transferred to the CLB. A CLB entry supports only a subset of data fields of the LB. The area of LB and CLB is smaller than a LB with the size of both buffers.

Additionally, random accesses to the data fields from multiple stages until completion are concentrated on the LB. Consequently, the CLB can be implemented as a standard first-in first-out (FIFO) structure with simple write and read ports and may be generated by memory compiler tools.

Figure 32:
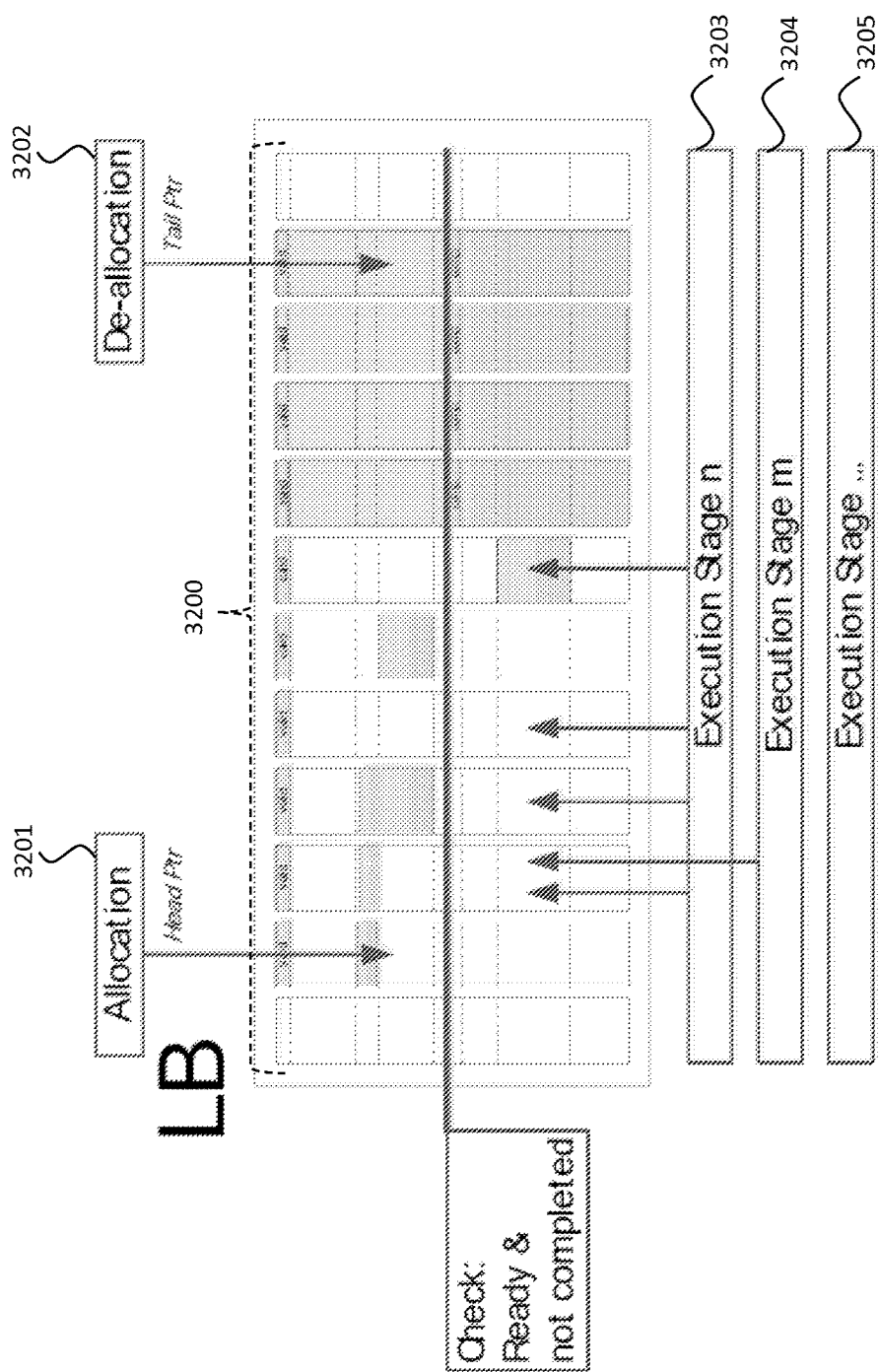
FIG. 32 illustrates an exemplary load buffer (LB) structure consisting of multiple equal entries.

FIG. 32 illustrates a classical LB structure consisting of multiple equal entries 3200. The LB is used as a Ring Buffer where new entries are inserted by allocation logic 3201 at the head pointer and removed by de-allocation logic 3202 at the tail pointer position. If a new entry is inserted or removed the related pointer is incremented and clipped with the number of LB entries.

All entries between the head pointer at allocation and the tail pointer at de-allocation represent all Load operations in flight in the memory execution unit(s) of the processor, as indicated by execution stages 3203-3205. In case all entries of the LB are occupied, the processor has to stall the allocation of new instructions until an older entry gets available at de-allocation.

Each entry has multiple data fields which are read, written and updated at the multiple execution stages 2303-2305. Any execution stage can access required data field by indexing the entry. Special circuits exist to detect, for example, the oldest ready and not completed entry. These circuits must be able to check all entries of the LB. The oldest ready entry is selected for re-dispatching. Theoretically the number of entries could be scaled up but, practically, area and timing constraints limit increasing the size of the LB.

Figure 33:
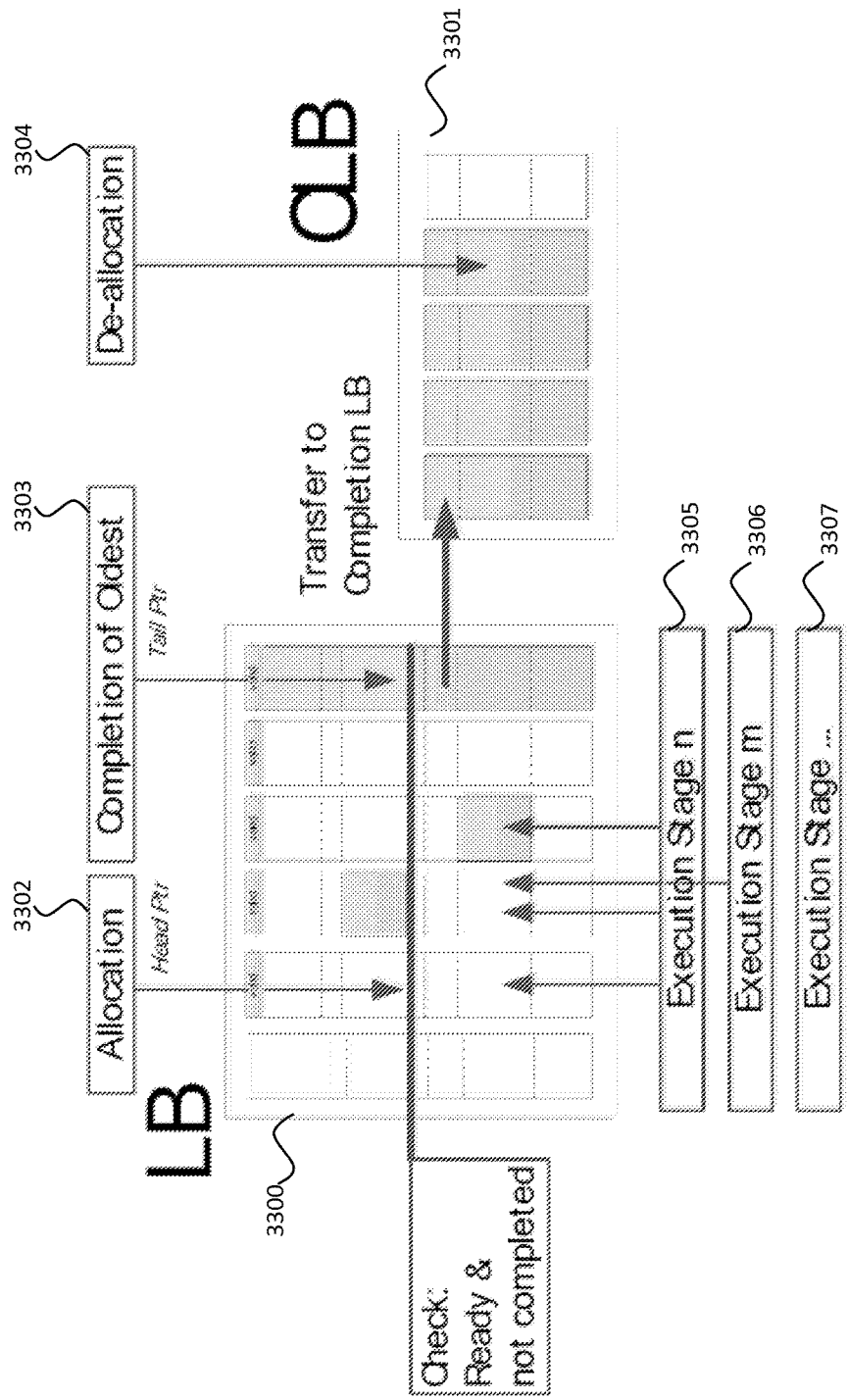
FIG. 33 illustrates a complete load buffer (CLB) 3301 in accordance with one embodiment of the invention.

FIG. 33 illustrates a CLB 3301 in accordance with one embodiment of the invention. The LB 3300 itself has the same functionality as the LB from FIG. 32 and includes allocation logic 3302 for adding new entries an updating the head pointer. The CLB 3301 is responsible for tracking all completed Load operations. In particular, completed Load operations identified by completion logic 3303 which maintains the tail pointer are transferred to the CLB or directly de-allocated. If the CLB 3301 is full, Load operations can remain in the LB 3300 until entries in the CLB 3301 are freed up by de-allocation logic 3304.

Thus, the CLB 3301 relieves the LB 3300 of completed operations. Entries are freed up and can be reused by new Load operations provided from the allocation logic 3302 thereby reducing allocation stalls. As a result, the number of Load operations inside the OOO execution window can exceed the number of LB entries, thereby increasing the OOO execution window without scaling up the LB itself. Moreover, the range of special circuits can be limited to the number of LB entries.

A simulation environment was used for evaluating performance of one embodiment of the invention. As the dynamic binary translator (BT) performs speculative optimizations, atomicity is used very frequently and this forces Load operations to stay in the LB until retirement.

Two experiments were performed, showing a nearly similar IPC gain dependent on scaling up the LB or introducing a CLB.

A comparison of a processor design with a LB with 52 entries against a LB with 40 entries shows an overall performance increases by 0.3% when scaling up the LB:
  SPECfp2000: IPC 0.34%
  SPECfp2006: IPC 1.37%
  SPECint2000: IPC 0.15%
  SPECint2006: IPC 0.12%
  LB40+ CLB12 vs LB40

The overall performance increases by 0.24% when CLB of 12 entries is used:
  SPECfp2000: IPC 0.33%
  SPECfp2006: IPC 1.08%
  SPECint2000: IPC 0.10%
  SPECint2006: IPC 0.09%

Figure 34:
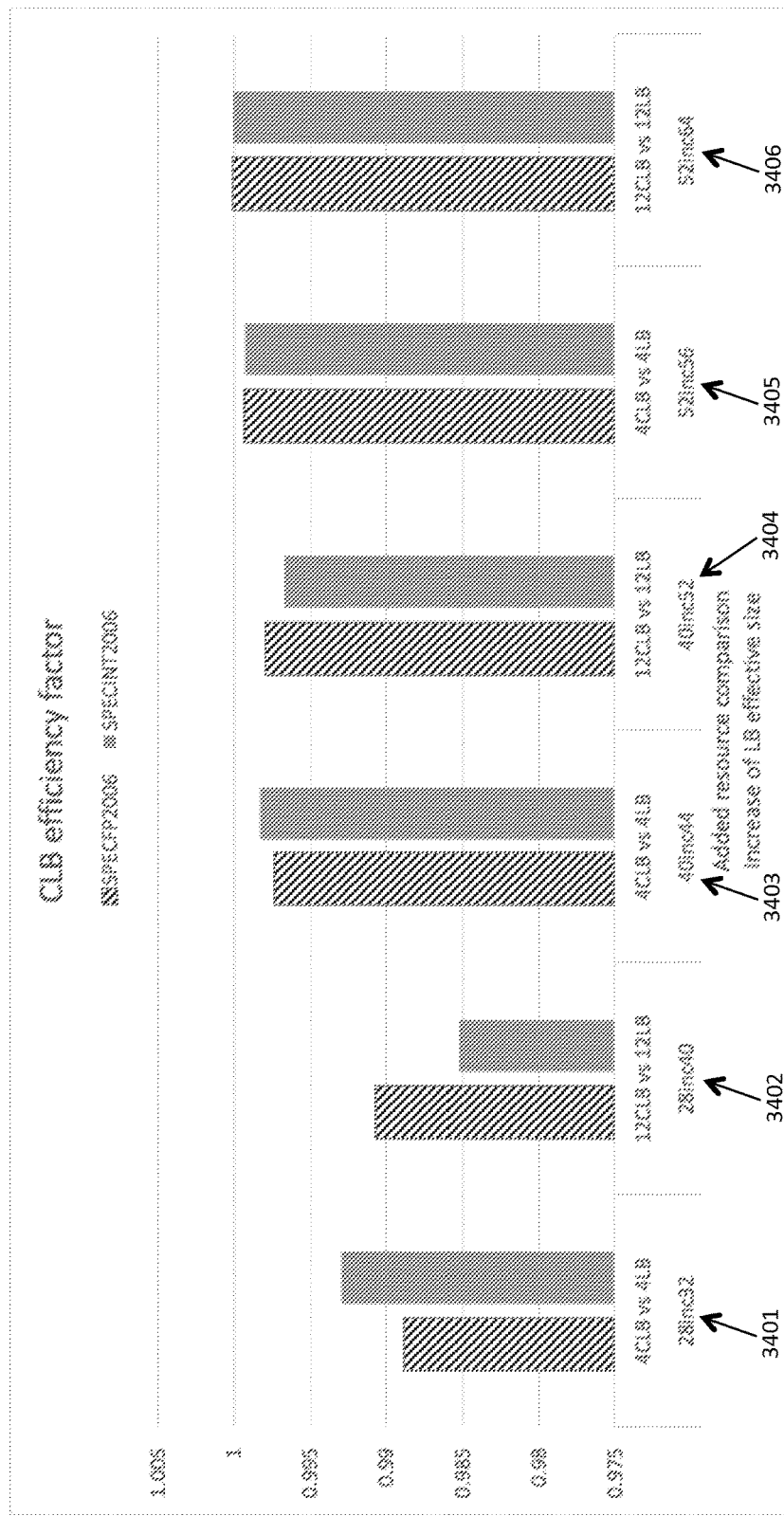
FIG. 34 illustrates a graph which shows an efficiency factor of the CLB in comparison to extending the LB.

FIG. 34 illustrates a graph which shows the efficiency factor of the CLB in comparison to extending the LB. Every category 3401-3406 shows an increase to the size of the LB. For example, category 3401 shows an increase from 28 entries to 32, category 3402 shows an increase from 28 to 40, etc, up to category 3406 which shows an increase from 52 to 64. Given the speedup of increasing the LB size from 28 to 32, the bar shows what percentage of that speedup is achieved by adding 4 CLB entries instead of 4 LB entries. As expected, for bigger sizes, the difference flattens, because the performance improvement becomes smaller. Overall, the effectiveness of the CLB is close to 99.5% for both SPECint and SPECfp.

F. System and Method of Handling Transactional and Atomic Memory in an Out-of-Order Binary Translation Based Processor A transactional memory architecture is a key feature in many current processors and is used to implement Hardware Lock Elision (HLE) and Restricted Transactional Memory (RTM). A transactional memory system can also be used to support dynamic binary translation (DBT) as is used in the Code Morphing Software (CMS). Although the underlying hardware is similar, DBT has different requirements than HLE or RTM.

State-of-the-art transactional memory solutions, such as the HLE/RTM implementation, are used to improve concurrent execution of sequences that would otherwise be serialized in multithreaded/multi-core workloads. Our goal is to improve single thread performance. An example of such an optimization is speculative static (SW-assist) memory reordering which has an IPC improvement potential of about +10% (for SP EC2006 measured on a performance simulator).

HLE/RTM provides instruction set extensions that allow programmers to specify regions of code for transactional synchronization. Programmers can use these extensions to achieve the performance of fine-grain locking while actually programming using coarse-grain locks. This extension is implemented in current processors to allow the core to reduce the performance impact of acquiring and releasing locks when there is little contention within the critical section protected by the lock.

It is critical to understand that HLE/RTM is a benefit to applications that contain instructions with IA lock semantics, but it is not sufficient for supporting efficient binary translation. The reason is that HLE/RTM relies on detection and tracking of the transactional region state between lock variables. Lock variables have strict semantic guarantees that may block memory re-ordering across the lock. Lock semantics force increased latency for transaction start and end within the memory system since memory speculation across the fence is disallowed. Transactional regions in a DBT system do not require lock semantics, but do require very low-latency commit operations.

The embodiments of the invention include a low-latency transactional memory system tailored explicitly for supporting a DBT. In one embodiment, each transactional region within the memory cluster is speculative and will eventually be committed in case there are no disruptions or exceptions, or rolled back in case the speculative assumptions were wrong. The memory updates made during the transactional region become architecturally visible to other CPUs at commit points. On rollback, the speculative state younger than the rollback event may be restored to the last committed and checkpointed architecture state. In order to indicate the one cycle commit operation to the execution units within the processor, an additional micro-operation (uop) or flow marker may be used. The rollback condition may be detected by hardware and indicated either to the binary translation software layer or microcode (ucode). Every snoop from other CPUs which hits a speculative cache line within a transactional region will cause a rollback.

The behavior of HLE/RTM regions to perform optimizations is expected to have lock semantics. In contrast, the vast majority of the binary translation optimized code is not expected to have lock semantics nor does CMS require such strict fencing behavior. The size of transactional regions required by the binary translation software must support 10's of transactional regions in-flight at any time with near zero-cost commits, which is not possible in HLE/RTM. A further limitation of HLE/RTM is the support of transactional regions that consist of Write-Back (WB) memory types only. For performance reasons on an out-of-order processor with a binary translation software layer, it is important that transactional regions support write combining (WC) and non-temporal (NT) types while seamlessly integrating with other memory types and MMIO/IO operations.

Figure 35:
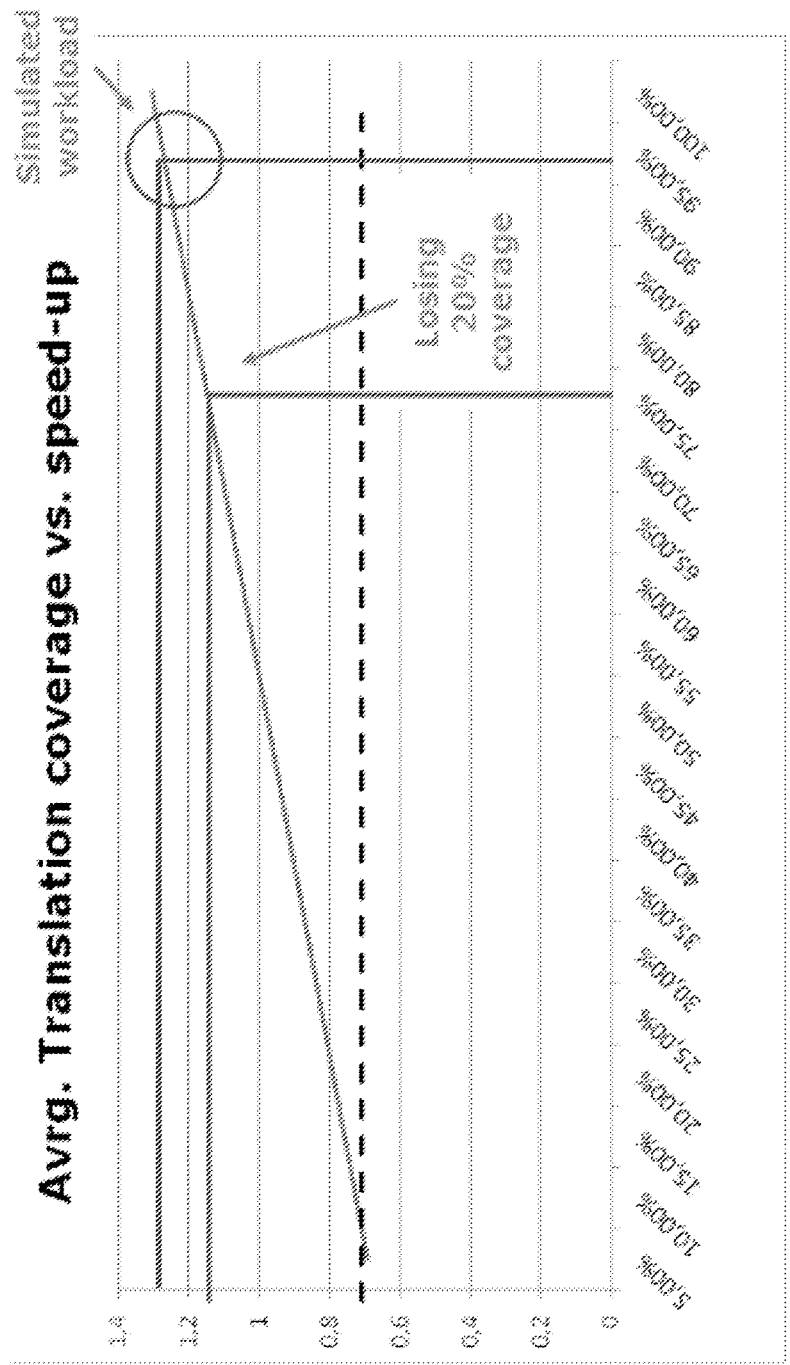
FIG. 35 illustrates an analysis of a write combine (WC) memory type dominant workload of instructions.

FIG. 35 shows an analysis of a write combine (WC) memory type dominant workload of 1 billion x86 instructions. An approximately 10% IPC performance loss was calculated when losing 20% translation coverage going from 93% to 73% optimized code (translation) coverage. This may happen when the WC memory type is not supported within a transactional region when applying the HSW-like HLE/RTM implementation solution and the WC memory type dominant code has to be executed in x86 native mode.

In one embodiment, transactional region support in the memory execution cluster (MEU) is implemented at the granularity of a 64-byte cache line, requiring modifications in the Data Cache Unit (DCU) as well as in the Memory Ordering Buffer (MOB).

Figure 36:
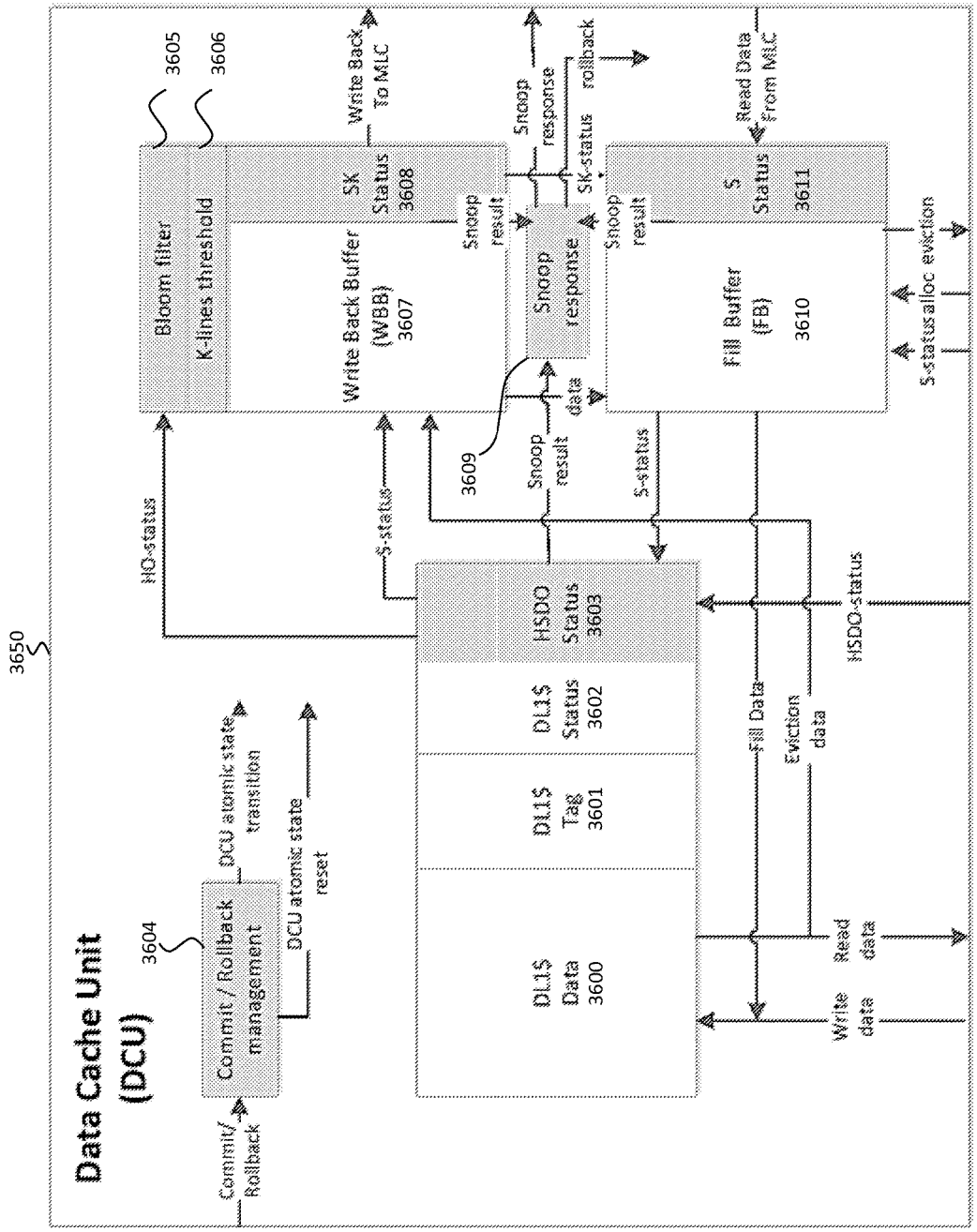
FIG. 36 illustrates a data cache unit (DCU) implemented in accordance with one embodiment of the invention.

FIG. 36 illustrates a data cache unit (DCU) 3650 implemented in accordance with one embodiment of the invention. Data is stored as a plurality of cache lines, each of which includes a data component 3600, a tag 3601, and status information 3602-3603. Also illustrated is a fill buffer 3610 comprising a plurality of entries and having status information 3611 associated therewith and a write back buffer (WBB) 3607 also having status information 3608. Additional components include commit/rollback management logic 3604; a bloom filter 3605; and k-lines threshold logic 3606. The operation of each of these components is described below in accordance with the embodiments of the invention.

In one embodiment, transactionality is tracked in the DCU 3650 with four status bits 3603 for each cache line in the DL1 cache. Collectively, these bits are referred to as the HSDO status bits which are defined as follow:

O: Observed status bit. The O bit means that the line was read during the current transactional region.

H: Hoisted status bit. The H bit indicates that the line was read during the previous transactional region and will be observed (i.e., have its O bit set, in the current region). The H bit is useful for aggressive load hoisting and eliminating loads through the use of loop invariant code motion (LICM).

S: Speculative status bit. The S bit indicates that the line was speculatively modified in the current region.

D: Dirty status bit. The D bit indicates that the line was modified, either non-speculatively or speculatively.

In one embodiment, on a commit operation, all O bits get the values of H bits, and H and S bits are cleared. On a rollback, all O and H bits are cleared, and lines with the S bit set are invalidated. The HSDO mechanism provides for collaboratively managing transactional support with CMS within a speculative region.

In one embodiment, speculative cache lines are not allowed to propagate to a higher level in the memory hierarchy. However, they can be evicted to the Write Back Buffer (WBB) 3607, which is normally responsible for keeping the evicted dirty lines before writing them back to the higher level in the cache hierarchy. The evicted speculative lines will be kept in the WBB 3607 until the transactional region commits. To distinguish speculative from non-speculative lines in the WBB 3607, each line state 3608 in the WBB is extended with an S bit that is set when evicting a speculative line from the DL1 cache 3600 to the WBB 3607. On a commit, S bits are cleared. On a rollback, lines with S bit set are invalidated.

When a speculative store is about to overwrite a non-speculative dirty line in the DL1 cache 3600, the non-speculative copy of the line is evicted to the WBB 3607, in order to be able to recover the non-speculative memory state on a rollback. We refer to this dirty non-speculative copy of a line that is pushed to the WBB as a commit-killable k-line. Evicting a k-line is the same basic operation as an eviction from the DCU to the WBB in a traditional (e.g., P6) style OOO operation. To distinguish k-lines from other lines in the WBB 3607, each line state 3608 in the WBB is extended with a K bit which is set when evicting a k-line from the DL1 cache 3600 to the WBB 3607 (K-push). K-lines may be invalidated on a commit operation which commits the more recent speculative version of the lines. On a rollback, speculative copies of the lines may be invalidated and the k-lines are made persistent by clearing the K-bit and thus recovering their status to be dirty and non-speculative. K-lines are allowed to be written back to the higher level in the memory hierarchy. An optimization is k-lines threshold logic 3606 to keep the k-lines within the WBB 3607 until a threshold is exceeded, in order to increase their lifetime within the MEU until the transactional region commits. Commits invalidate the k-lines and thus save unnecessary write backs to the higher cache hierarchy levels, reducing power consumption.

In one embodiment, the WBB 3607 acts as a victim cache and can satisfy data cache misses that hit a non k-line in the WBB. In HSW, unlike the present embodiment, cache misses that hit a line in the WBB are blocked until the line drains out of the WBB. In the present embodiment, satisfying a data cache miss that hits a speculative line in the WBB ensures forward progress in the execution, since speculative lines cannot drain out of the WBB.

In one embodiment, the Fill Buffer (FB) 3610 in the DCU, keeps track of in-flight cache misses and manages evictions from the cache to the WBB 3607 and replacements of a new cache line from the FB 3610 into the DL1 cache 3600. In one embodiment, it also handles Global Observation (GO) requests and uncacheable and Write Combining (WC) operations. The FB 3610 also handles store merging for cache misses.

In order to support transactional regions in the FB 3610 additional SD (Speculative and Dirty) status bits 3611 are required for each line in the FB. On a data cache miss, if the line is written into the FB 3610 from the DL2 cache, the line is assumed to be non-speculative and clean. On the other hand, if the line comes from the WBB 3607, it is implicitly dirty and its speculative status is the S-bit from the WBB that is also sent to the FB 3610. A store that merges (writes) into the FB 3610 also sets the D bit and if it is speculative the S bit. In one embodiment, speculative stores are not allowed to merge into a dirty non-speculative line in the FB 3610. The state of the line needs to be updated on commits and rollbacks: Commits clear the S bits in the FB 3610, while rollbacks invalidate the speculative lines (S-bit set) in the FB. Upon filling a new line from the FB 3610 into the DL1 cache 3600, the SD bits 3611 in the FB may be used to initialize the SD bits in the DL1 cache HSDO array 3603.

In one embodiment, a Bloom Filter 3605 in the DCU is used to cost-efficiently track the HO bits of cache lines evicted from the DL1 cache 3600. When a cache line with any of the HO bits set is replaced in the DL1 cache 3600, the HO bits for the replaced line update the Bloom Filter that is indexed with a subset of the line address. Loads that cannot update the HO bits in the DL1 cache for some reason, also update the Bloom Filter 3605 instead. On a commit, the O bits get the values of the H bits and H bits are cleared. On a rollback, all O and H bits are cleared. In other embodiments of the invention, the WBB 3607 and FB 3610 can also be augmented with support to track the HO bits for the lines they hold.

In a multi-core or multi-processor (MP), coherent domain transactional support implementation may piggyback on cache coherence and the snoop protocol therein. The snoop agents that are aware of the speculative state of a cache line within the transactional region are: the DL1 cache HSDO state array 3603, the WBB 3607, the FB 3610, and the Bloom Filter 3605. In one embodiment, the hardware responds to snoop requests internally to maintain transactionality.

Transactional semantic is guaranteed whenever all of the lines read during a transactional interval saw no Snp2I (Snoop Invalidation) requests and no writes saw a Snp2I or Snp2S (Snoop Data) request. More concretely, a rollback will occur before the next commit if a Snp2I hits an H, O, or S bit protected line or a Snp2S hits an S bit protected line.

Figure 37:
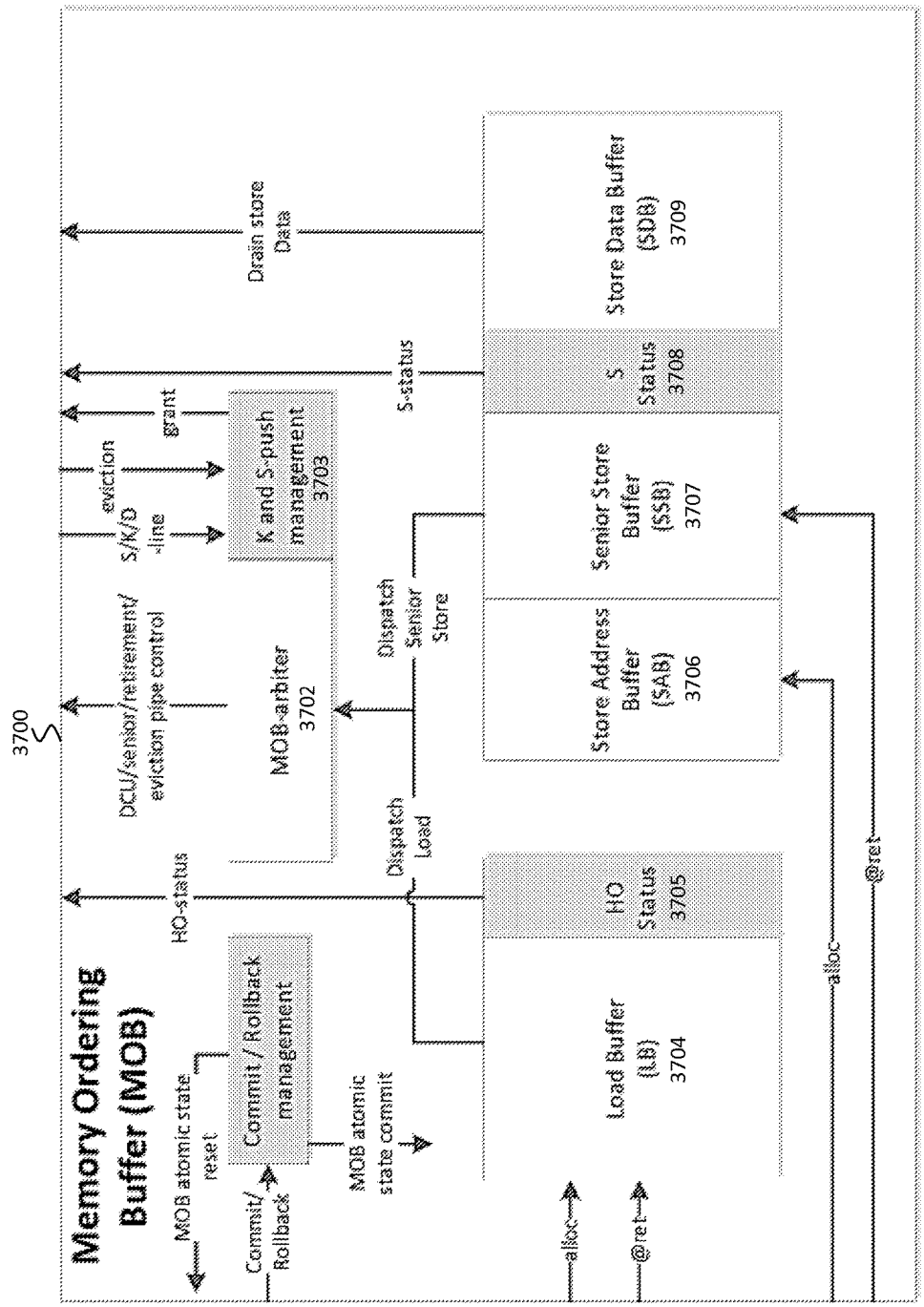
FIG. 37 illustrates a memory ordering buffer (MOB) implemented in one embodiment of the invention.

FIG. 37 illustrates a memory ordering buffer (MOB) 3700 implemented in one embodiment of the invention which includes a load buffer (LB) 3704, a store address buffer (SAB) 3706, a senior store buffer (SSB) 3707, and a store data buffer (SDB) 3709. An OOO MEU decouples the execution, retirement and draining of the store and thus it reduces the perceived latency of store misses. For performance reasons it is not desirable to require the SSB 3707 to drain before a commit of the transactional region occurs. As such, speculative state 3708 is extended into the SSB which may contain a mix of speculative and non-speculative stores. The non-speculative stores are always older than the speculative stores within the SSB. The DCU 3650 state of a cache line is only known at time of a senior store dispatch and as already described above, when speculative store overwrites modified non-speculative data, this data needs to be protected, and thus a K-push is performed by K and S push management logic 3703. When the MOB 3700 detects such a condition the dispatch of the speculative senior store needs to be canceled. After the K-push is being executed, the speculative senior store may be re-dispatched.

One embodiment of the MOB includes a load buffer (LB) 3704 with HO status bits 3705. The life of a load within the Load Buffer (LB) 3704 is: allocation, execution (dispatch), completion and retirement. Within the transactional region a speculative load needs to be tracked until the region successfully commits using a combination of the LB 3704 and the HSDO bit array. There is no need to keep multiple copies of read-only data, but it is required that all speculatively read lines be tracked from the point they are first accessed until the region from which the load originated is committed by extending the LB 3704 by two additional status bits (H-(hoisted) and O-(Observed) Lines) 3705. In case a load is part of the transactional region, e.g., the oldest commit in the machine is younger than the load, then the load will become senior at retirement and must set the HO bits 3705 non-speculatively from the perspective of the pipeline. Note however that the load does not need to be re-executed at retirement since any snoop for a line in the load buffer will generate a pipeline flush.

In one embodiment, post-retirement transactionality is guaranteed by the speculative DCU and associated machinery. Transactional semantic prior to retirement relies on having the LB pipeline snooped. The existence of transactional commits allows CMS to re-order loads freely within a speculative region as all loads will instantaneously be globally observed with the commit. However, CMS must respect memory dependences within the translation.

There are numerous benefits realized by the embodiments of the invention described above including, but not limited to:

Single-cycle commit operations using at-retirement semantics in an out-of-order processor.

"Discrete commits," but not lock semantics at commit boundaries like HLE/RTM. So efficient back-to-back commits are supported.

HSDO status bits allowing for memory operations to be speculatively read and written in the cache.

Speculative write back buffer which allows speculative evictions.

Delayed write backs to higher cache hierarchy of speculative overwritten modified lines.

Extension of speculative state into the fill buffer and store buffer.

Handling events inside transactional region.

Selectively upgrade to atomic semantics possible by draining the store buffer and using fence operations.

G. Speculative Memory Management in a Binary Translation Based Out of Order Processor The embodiments of the invention include techniques for performing memory management in an out of order dynamic binary translation (DBT)-based processor within speculative and transactional regions. In one embodiment, these techniques are implemented within a memory management unit (MMU) of a processor. The MMUs used in current transactional memory solutions, such as in HLE/RTM implementations, do not allow speculative state and do not support speculative virtual-to-physical translations in the MMU. This limitation shows significant performance problem because a page miss handler's (PMH's) stuffed load that hits a modified Tx cache line will cause mis-speculation. When stuffed loads use Tx modified data in page walk, the translations are speculative and should not be visible outside of Tx region. Since the TLB doesn't get flushed on Tx mis-speculation, stuffed loads can't use Tx modified data. A DBT based out-of-order processor must support IA memory semantics. In particular, the MMU must respect the paging semantics of IA which turn has a large influence on the design of the translation lookaside buffers (TLBs) and the PMH. The existence of atomically speculative memory operations with rollback and commit semantics, a concealed exception model, and speculative static reordering of memory operations adds additional constraints on the design of the TLBs and PMH.

A conventional IA processor assumes that there is a single IA address space that is broken into different memory types based on a combination of page tables, page attribute table (PAT), memory special registers (MSRs), memory type range registers (MTRRs), and other control registers. A DBT based out-of-order processor must support the IA memory types, but it also requires a private address space not visible to the guest IA system and mechanisms for safe speculation of emulated memory accesses. Static memory reordering and the elimination of memory operations by CMS adds new scenarios for TLB consistency that are not present in a conventional OOO processor. There are three classes of flows that need to be considered. The first are due to PMH and TLB actions that cannot be done speculatively. The second are the result of speculatively loaded TLB entries. The IA memory model defines that accessed and dirty (A and D) bits cannot be set speculatively.

Figure 38:
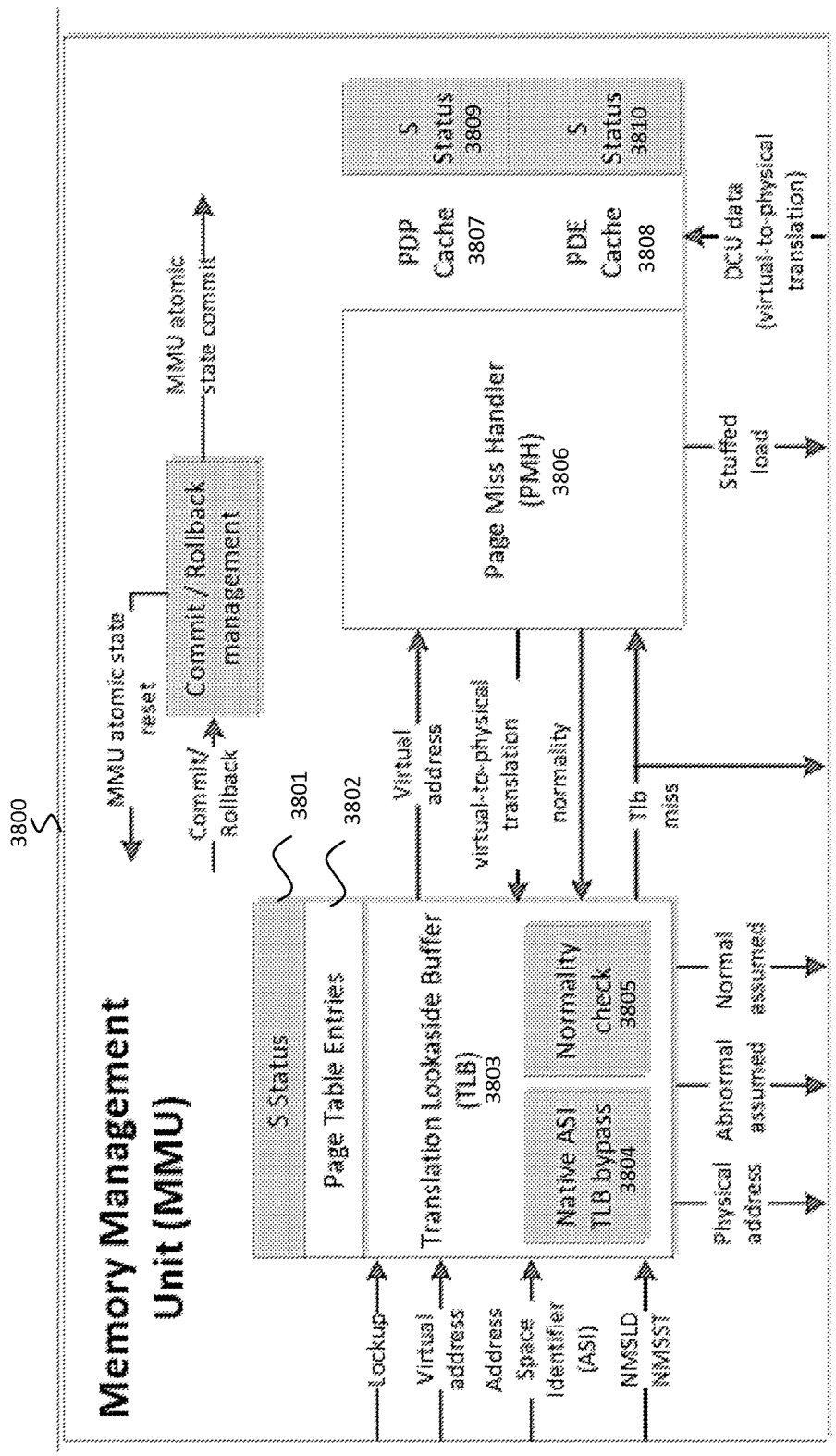
FIG. 38 illustrates one embodiment in which a Memory Management Unit (MMU) includes speculative transactional region support.

The embodiments of the invention resolve all of the problems described above. FIG. 38 illustrates one such embodiment in which a Memory Management Unit (MMU) 3800 includes speculative transactional region support. In particular, the illustrated embodiment introduces an address space identifier (ASI) which is used by CMS and the DBT-based out-of-order processor hardware to communicate the address space used by a particular memory instruction, thereby distinguishing the emulated address space (x86) and the native address space (CMS). In one embodiment, the TLB 3803 includes native ASI TLB bypass logic 3804 to bypass the TLB for all memory references to the native address space. Normality check logic 3805 implements the concept of "normality" in which "normal" memory may be re-ordered or have operations eliminated. The majority of memory accesses are normal. "Abnormal" memory is not re-ordered and has other restrictions on how it may be scheduled with respect to commits and other memory operations. A fault occurs in response to a normality violation such as a load with a normal-assumed normality accesses a page with abnormal memory rules (see details below). It should be noted that a load or store instruction with a flag indicating a "normal" memory access will fault when accessing a memory location with an "abnormal" indicator. Consequently, the "normal"-flagged instruction is described herein as "normal-assumed" to distinguish from "normal"- or "abnormal"-typed memory.

In one embodiment, CMS is able to emulate a superset of the functionality of the hardware PMH 3806 as needed. This includes corner cases due to atomicity not easily supported directly in the PMH 3806. One embodiment of the PMH 3806 operates on physical addresses and hence CMS cannot use the same memory operations used for emulated IA memory space. The PMH does not handle all page walks in hardware on the DBT based out-of-order processor. In some cases, such as A/D bit setting, the PMH 3806 signals the binary translation software layer to complete the walk non-speculatively. One embodiment of the invention includes two new instructions: nonmapped stuffed loads (NMSLD) and non-mapped stuffed stores (NMSST) to support such operations.

In one embodiment, entries in the TLB 3803 that are accessed during a speculative commit interval are marked as being speculative. When a commit atom executes, it clears the speculative bits in the TLBs. When a rollback occurs, TLB entries with the speculative bit set are invalidated. The reason for speculative bits in the TLB 3803 is to ensure that a speculative load does not cause a stale mapping to become resident in the TLB. Furthermore, when Stuffed loads issued by the PMH 3806 use speculative modified data in page walk, the cached translations are marked speculative in the PMH's Page Directory Pointer (PDP) cache 3807 and Page Directory Entry (PDE) cache 3808. Similar to the TLB, when a commit instruction retires, PMH 3806 clears the speculative bits 3809-3810 in the PMH. When a rollback instruction retires, PDP/PDE cache entries with the speculative bit set are invalidated.

As mentioned, the embodiments of the invention use the address space identifier (ASI) by the BT software layer and the DBT-based processor hardware to communicate the address space used by particular memory instructions. The ASI may be for emulated or native memory. The ASI also specifies the speculative behavior of the memory instruction. As used herein, emulated memory refers to the IA memory space seen by the guest IA system. Native memory is disjoint from emulated memory and exists in a protected, concealed space. In one embodiment, native memory bypasses the TLB 3803, but is re-located based on a variety of Memory Special Registers (MSRs) that define the concealed address space. The ASI communicates to the hardware how the memory cluster should handle the particular memory instruction.

In one embodiment, the DBT-based processor handles IA memory types in a similar manner as a conventional OOO processor. The MSRs related to memory types are kept at the PMH 3806 and the PMH appends the effective memory type to the TLB 3803 entry when a page walk completes. CMS is capable of performing speculation to certain memory types (e.g., write-back memory types), but it must be careful when accessing memory types with side effects (e.g., uncacheable (UC) memory types). CMS cannot know the memory type when generating binary translations from particular x86 code regions, so in one embodiment, there is a hardware mechanism for validating that CMS's assumptions about memory type match the effective memory type.

As mentioned, one embodiment of the invention introduces the concept of normality. CMS may encode an assumed normality in the memory operation. If CMS has done re-ordering, it will use the normal ASIs. If CMS has found that the translation may access an abnormal memory type, it will encode an abnormal ASI and follow the abnormal memory rules.

The effective normality may be determined in the PMH 3806. The assumed normality is checked against the effective normality when the memory operation accesses the TLB 3803. A fault occurs if a normality violation occurs (e.g., a load with a normal-assumed normality accesses a page found to be uncacheable (UC) memory). The faults are necessary to stop CMS and the hardware from speculatively touching memory with side effects. The mechanism also allows CMS to be very aggressive in scheduling memory and fall back to more conservative mechanisms as needed. A full discussion of how and when CMS uses normal versus abnormal memory is beyond the scope of the present disclosure. In one embodiment, the PMH 3806 will service the vast majority of the TLB misses without binary translation software layer intervention. However, the CMS is able to emulate a superset of the functionality of the hardware PMH as needed. This includes corner cases due to atomicity not easily supported directly in the PMH 3806. The PMH operates on physical addresses and hence CMS cannot use the same memory operations used for emulated IA memory space.

One embodiment of the ISA interface provides non-mapped stuffed loads (NMSLD) and non-mapped stuffed stores (NMSST) to support such operations. NMSLD and NMSST operations use a physical address provided directly by CMS. However, it is still necessary to generate the proper memory type for use by NMSLD and NMSST in the TLB. Static memory reordering and the elimination of memory operations by CMS adds new scenarios for TLB consistency that are not present in a conventional OOO processor. There are two classes of flows that need to be considered. The first are due to PMH 3806 and TLB 3803 actions that cannot be done speculatively. The second are the result of speculatively loaded TLB entries. The IA memory model defines that accessed and dirty (A and D) bits cannot be set speculatively. Page walks that would access UC memory are also not allowed speculatively. One embodiment of the invention resolves both of these issues. A conventional OOO processor relies on the fact that any instruction that is the oldest in the pipeline, which is referred to as atretirement or simply @ret, is non-speculative; the instruction will either fault or complete. A BT-based out of order processor cannot wait for an offending memory operation to be @ret since the BT-based host ISA ordering does not imply IA ordering. The memory operation may still be rolled back by CMS, and it may be totally spurious due to aggressive re-ordering. The BT-based processor of one embodiment ensures that common speculative memory operation is supported within the MMU 3800 in order to perform a speculative page walk. Rare cases such as setting of A and D bits handles the CMS by rolling back, re-executing in the x86 native mode to filter spurious faults and enforcing memory ordering, and then performing the non-speculative page walk in software without the PMH 3806. Another issue DBT-based processor must address is the consequence of TLB entries loaded by speculative memory operations. The following example illustrates the issue.

Imagine an atomic region in which there is store X that writes to address A. In the same region load Y then reads address B. The mapping for B is not in the TLB 3803 so the PMH 3806 initiates a page walk. The page walk uses a PDE 3807 or PTE 3808 that exists at address A. The TLB 3803 now contains a mapping for B that has been altered by store X. The atomic/transactional region is rolled back due to incorrect memory speculation by CMS. CMS then re-executes the region, but this time store X does not occur, but load Y does. Load Y uses the TLB entry that was previously loaded. Load Y is now using a possibly-corrupt TLB entry, which should not be allowed.

To address this issue, in one embodiment, the TLB 3803 entries that are accessed during a speculative commit interval are marked as being speculative, indicated by S status bits 3801 in the TLB 3803. When a commit atom executes, it clears the speculative bits 3801 in the TLBs. When a rollback occurs, TLB entries with the speculative bit set are invalidated. The reason for speculative bits 3801 in the TLB 3803 is to ensure that a speculative load does not cause a stale mapping to become resident in the TLB. Furthermore, when Stuffed loads issued by the PMH 3806 use speculative modified data in pagewalk, the cached translations are marked speculative in the PMH's Page Directory Pointer (PDP) cache 3807 and Page Directory Entry (PDE) cache 3808. Similar as in the TLB, when a commit instruction retires, PMH 3806 clears the speculative bits in the PMH. When a rollback instruction retires, PDP/PDE cache entries 3807/3808 with the speculative bit 3809/3810 set are invalidated.

In contrast to the embodiments of the invention described above, the behavior of HLE/RTM regions to perform optimizations do not support speculative virtual-to-physical translations in the MMU. The size of transactional regions required by the binary translation software must support 10's of transactional regions in-flight at any time with near zero-cost commits, which is not possible in HLE/RTM. Thus, misspeculation or rollback on speculative read page table entries have a significant single thread performance impact in an out-of-order processor with binary translation software layer.

One embodiment of the invention addresses the above problems by incorporating one or more of the following features:

Distinguishes the emulated address space (x86) and the native address space (CMS)
Introduces an ISA interface to the DBT software layer:
    Concept of normality which allows memory ordering assumption by CMS with checks and protection in the TLB (normal/abnormal-assumed faults).
    Two new instructions are provided NMSLD/NMSST to fix software-assist corner cases trapping to CMS.
Allows speculative page walk by PMH.
Allows speculative page table entries (virtual-to-physical translations) in the TLB.
Supports TLB and PMH consistency within transactional and atomic memory regions.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a processor having a plurality of cores to execute a binary translation system comprising a plurality of components;
thread scheduling logic to schedule the plurality of components to ensure that the plurality of components execute together on a single simultaneous multi-threaded (SMT) core, wherein the thread scheduling logic is to schedule a first code fragment for binary translation substantially concurrently with the scheduling of a second code fragment for execution through a translation-execution thread, wherein the second code fragment was translated through a binary translator thread or interpreted through an interpreter thread, wherein the first code segment and the translated or interpreted second code fragment are stored in a common cache slice, wherein each of the binary translator thread, the interpreter thread, and the translation-execution thread is executed on a separate logical core of the single SMT core, and the execution of the plurality of components together in the single SMT core is performed based on setting a processor affinity field of the binary translator thread, the interpreter thread, and the translation-execution thread, and
wherein one or more translation lookaside buffer (TLB) entries or translation T-bit-agent (XTBA) entries are shared by two or more of the binary translator thread, the interpreter thread, and the translation-execution thread.

2. The apparatus as in claim 1 wherein the binary translator thread, the interpreter thread, and the translation-execution thread are to be scheduled on the single SMT core and wherein common source code streams associated with successive binary translator, interpreter, and translation-execution phases of a binary translation system index to a common set of physical memory pages.

3. The apparatus as in claim 1 wherein the binary translator thread, the interpreter thread, and the translation-execution thread are to be preempted and/or context-switched according to thread scheduling activity implemented by the thread scheduling logic.

4. The apparatus as in claim 1 wherein the binary translation system comprises a code morphing system (CMS).

5. The apparatus as in claim 1, wherein the thread scheduling logic is further to schedule the plurality of components to ensure that the plurality of components execute together on multiple cores sharing a common mid-level cache (MLC).

6. The apparatus as in claim 1, wherein the first code fragment and the second code fragment are consecutive fragments of instructions.

7. The apparatus as in claim 1, wherein the binary translator thread and the interpreter thread run on physical addresses without using virtual and physical address translation.

8. The apparatus as in claim 1, wherein the binary translator thread, the interpreter thread, and the translation-execution thread share a single pre-fetcher.

* * * * *